United States Patent
Moulton

(10) Patent No.: US 7,272,602 B2
(45) Date of Patent: Sep. 18, 2007

(54) SYSTEM AND METHOD FOR UNORCHESTRATED DETERMINATION OF DATA SEQUENCES USING STICKY BYTE FACTORING TO DETERMINE BREAKPOINTS IN DIGITAL SEQUENCES

(75) Inventor: Gregory Hagan Moulton, Irvine, CA (US)

(73) Assignee: EMC Corporation, Hopkinton, MA (US)

(*) Notice: Subject to any disclaimer, the term of this patent is extended or adjusted under 35 U.S.C. 154(b) by 568 days.

(21) Appl. No.: 10/861,796

(22) Filed: Jun. 4, 2004

(65) Prior Publication Data

US 2004/0225655 A1 Nov. 11, 2004

Related U.S. Application Data

(63) Continuation of application No. 09/777,149, filed on Feb. 5, 2001, now Pat. No. 6,810,398.

(60) Provisional application No. 60/245,920, filed on Nov. 6, 2000.

(51) Int. Cl.
 *G06F 17/30* (2006.01)
 *G06F 7/00* (2006.01)
(52) U.S. Cl. ............................................. 707/6
(58) Field of Classification Search ............... None
 See application file for complete search history.

(56) References Cited

U.S. PATENT DOCUMENTS

| | | | |
|---|---|---|---|
| 3,668,647 A | 6/1972 | Evangelisti et al. | 707/1 |
| 4,215,402 A | 7/1980 | Mitchell et al. | 711/216 |
| 4,404,676 A | 9/1983 | DeBenedictis | |
| 4,649,479 A | 3/1987 | Advani et al. | 718/1 |
| 4,761,785 A | 8/1988 | Clark et al. | 714/805 |
| 4,887,204 A | 12/1989 | Johnson et al. | 707/10 |
| 4,887,235 A | 12/1989 | Holloway et al. | 711/216 |
| 4,897,781 A | 1/1990 | Chang et al. | 707/201 |
| 4,901,223 A | 2/1990 | Rhyne | 345/475 |
| 4,929,946 A | 5/1990 | O'Brien et al. | |
| 4,982,324 A | 1/1991 | McConaughy et al. | 709/222 |

(Continued)

FOREIGN PATENT DOCUMENTS

WO PCT/AU96/00081 8/1996

OTHER PUBLICATIONS

Rabin, M.O. "Fingerprinting by Random Polynomials", Technical Report TR-15-81, Department of Computer Science, Harvard University, 1981.*

(Continued)

*Primary Examiner*—Luke S Wassum
(74) *Attorney, Agent, or Firm*—Workman Nydegger

(57) ABSTRACT

A system and method for unorchestrated determination of data sequences using "sticky byte" factoring to determine breakpoints in digital sequences such that common sequences can be identified. Sticky byte factoring provides an efficient method of dividing a data set into pieces that generally yields near optimal commonality. This is effectuated by employing a rolling hashsum and, in an exemplary embodiment disclosed herein, a threshold function to deterministically set divisions in a sequence of data. Both the rolling hash and the threshold function are designed to require minimal computation. This low overhead makes it possible to rapidly partition a data sequence for presentation to a factoring engine or other applications that prefer subsequent synchronization across the data set.

58 Claims, 11 Drawing Sheets

U.S. PATENT DOCUMENTS

| | | | | |
|---|---|---|---|---|
| 5,005,122 A | 4/1991 | Griffin et al. | ............... | 709/203 |
| 5,018,060 A | 5/1991 | Gelb et al. | ................. | 707/205 |
| 5,089,958 A | 2/1992 | Horton et al. | ................. | 714/5 |
| 5,109,515 A | 4/1992 | Laggis et al. | ................. | 707/10 |
| 5,133,065 A | 7/1992 | Cheffetz et al. | ............... | 714/2 |
| 5,146,568 A | 9/1992 | Flaherty et al. | ............... | 703/24 |
| 5,155,835 A | 10/1992 | Belsan | ........................ | 711/114 |
| 5,162,986 A | 11/1992 | Graber et al. | ................. | 700/17 |
| 5,163,148 A | 11/1992 | Walls | ........................ | 707/204 |
| 5,210,866 A | 5/1993 | Milligan et al. | ............... | 714/6 |
| 5,218,695 A | 6/1993 | Noveck et al. | ............. | 707/205 |
| 5,239,637 A | 8/1993 | Davis et al. | ................ | 711/165 |
| 5,239,647 A | 8/1993 | Anglin et al. | ............... | 707/205 |
| 5,239,659 A | 8/1993 | Rudeseal et al. | ............. | 714/6 |
| 5,263,154 A | 11/1993 | Eastridge et al. | ............. | 714/6 |
| 5,276,860 A | 1/1994 | Fortier et al. | ................. | 714/6 |
| 5,276,867 A | 1/1994 | Kenley et al. | ............... | 707/204 |
| 5,278,838 A | 1/1994 | Ng et al. | ........................ | 714/6 |
| 5,305,389 A | 4/1994 | Palmer | ........................ | 382/305 |
| 5,317,728 A | 5/1994 | Tevis et al. | ................. | 707/204 |
| 5,325,505 A | 6/1994 | Hoffecker et al. | ......... | 707/101 |
| 5,347,653 A | 9/1994 | Flynn et al. | ................. | 707/203 |
| 5,355,453 A | 10/1994 | Row et al. | ................... | 709/219 |
| 5,367,637 A | 11/1994 | Wei | ............................ | 710/56 |
| 5,367,698 A | 11/1994 | Webber et al. | ............... | 709/203 |
| 5,379,418 A | 1/1995 | Shimazaki et al. | ........... | 714/11 |
| 5,403,639 A | 4/1995 | Belsan et al. | ............... | 707/204 |
| 5,404,508 A | 4/1995 | Konrad et al. | ............... | 707/202 |
| 5,404,527 A | 4/1995 | Irwin et al. | ................. | 709/222 |
| 5,448,718 A | 9/1995 | Cohn et al. | .................... | 711/4 |
| 5,452,440 A | 9/1995 | Salsburg | ..................... | 711/136 |
| 5,452,454 A | 9/1995 | Basu | ............................ | 713/2 |
| 5,454,099 A | 9/1995 | Myers et al. | ................. | 714/6 |
| 5,479,654 A | 12/1995 | Squibb | ........................ | 707/201 |
| 5,485,474 A * | 1/1996 | Rabin | ......................... | 714/762 |
| 5,487,160 A | 1/1996 | Bemis | ......................... | 711/114 |
| 5,497,483 A | 3/1996 | Beardsley et al. | ............. | 714/1 |
| 5,513,314 A | 4/1996 | Kandasamy et al. | ........... | 714/6 |
| 5,515,502 A | 5/1996 | Wood | ......................... | 714/15 |
| 5,521,597 A | 5/1996 | Dimitri | | |
| 5,524,205 A | 6/1996 | Lomet et al. | ................. | 714/16 |
| 5,532,694 A * | 7/1996 | Mayers et al. | ............... | 341/67 |
| 5,535,407 A | 7/1996 | Yanagawa et al. | ............ | 705/39 |
| 5,544,320 A | 8/1996 | Konrad | ........................ | 709/203 |
| 5,559,991 A | 9/1996 | Kanfi | ......................... | 711/162 |
| 5,574,906 A | 11/1996 | Morris | ........................ | 707/1 |
| 5,586,322 A | 12/1996 | Beck et al. | ................. | 707/200 |
| 5,604,862 A | 2/1997 | Midgely et al. | ............... | 714/6 |
| 5,606,719 A | 2/1997 | Nichols et al. | ............... | 710/56 |
| 5,608,801 A | 3/1997 | Aiello et al. | | |
| 5,640,561 A | 6/1997 | Satoh et al. | ................. | 707/202 |
| 5,649,196 A | 7/1997 | Woodhill et al. | ........... | 707/204 |
| 5,659,743 A | 8/1997 | Adams et al. | ............... | 707/205 |
| 5,659,747 A | 8/1997 | Nakajima | ...................... | 713/1 |
| 5,696,901 A | 12/1997 | Konrad | ........................ | 709/203 |
| 5,742,811 A | 4/1998 | Agrawal et al. | | |
| 5,751,936 A | 5/1998 | Larson et al. | ................. | 714/7 |
| 5,754,844 A | 5/1998 | Fuller | ........................ | 707/6 |
| 5,765,173 A | 6/1998 | Cane et al. | ................. | 707/204 |
| 5,771,354 A | 6/1998 | Crawford | ..................... | 709/229 |
| 5,778,395 A | 7/1998 | Whiting et al. | ............. | 707/204 |
| 5,794,254 A | 8/1998 | McClain | ..................... | 707/204 |
| 5,802,264 A | 9/1998 | Chen et al. | .................... | 714/6 |
| 5,802,297 A | 9/1998 | Engquist | ..................... | 709/212 |
| 5,909,677 A * | 6/1999 | Broder et al. | .................. | 707/3 |
| 5,933,104 A | 8/1999 | Kimura | | |
| 5,978,791 A | 11/1999 | Farber et al. | .................. | 707/2 |
| 5,990,810 A * | 11/1999 | Williams | ...................... | 341/51 |
| 6,014,676 A | 1/2000 | McClain | ..................... | 707/204 |
| 6,016,553 A | 1/2000 | Schneider et al. | ............ | 714/21 |
| 6,029,168 A | 2/2000 | Frey | ............................ | 707/10 |
| 6,044,220 A | 3/2000 | Breternitz, Jr. | | |
| 6,085,298 A | 7/2000 | Ohran | ........................ | 711/162 |
| 6,122,754 A | 9/2000 | Litwin et al. | .................. | 714/4 |
| 6,141,421 A | 10/2000 | Takaragi et al. | | |
| 6,230,155 B1 * | 5/2001 | Broder et al. | .................. | 707/3 |
| 6,268,809 B1 | 7/2001 | Saito | | |
| 6,307,487 B1 | 10/2001 | Luby | | |
| 6,320,520 B1 | 11/2001 | Luby | ........................... | 341/50 |
| 6,374,250 B2 * | 4/2002 | Ajtai et al. | .................. | 707/101 |
| 6,611,213 B1 * | 8/2003 | Bentley et al. | ............... | 341/51 |
| 6,667,700 B1 * | 12/2003 | McCanne et al. | ............. | 341/51 |
| 6,704,730 B2 * | 3/2004 | Moulton et al. | ............... | 707/6 |
| 6,810,398 B2 * | 10/2004 | Moulton | ........................ | 707/6 |
| 6,828,925 B2 * | 12/2004 | McCanne et al. | ............. | 341/51 |
| 6,961,009 B2 * | 11/2005 | McCanne et al. | ............. | 341/51 |
| 7,116,249 B2 * | 10/2006 | McCanne et al. | ............. | 341/50 |
| 2001/0037323 A1 | 11/2001 | Moulton et al. | | |
| 2002/0010797 A1 | 1/2002 | Moulton | | |
| 2002/0152218 A1 | 10/2002 | Moulton | | |
| 2004/0148306 A1 * | 7/2004 | Moulton et al. | ............ | 707/101 |
| 2005/0091234 A1 * | 4/2005 | Hsu et al. | ................... | 707/100 |

OTHER PUBLICATIONS

Karp, R.M. and M.O. Rabin "Efficient Randomized Pattern-Matching Algorithms"m IBM Journal of Research and Development, vol. 31, No. 2, Mar. 1987, pp. 249-260.*

Broder, A.Z. "On the Resemblance and Containment of Documents", Proceedings of the IEEE Conference on Compression and Complexity of Sequences, Jun. 11-13, 1997.*

Spring, N.T. and D. Wetherall "A Protocol-Independent Technique for Eliminating Redundant Network Traffic", Proceedings of the Conference on Applications, Technologies, Architectures and Protocols for Computer Communication, 2000, pp. 87-95.*

Tridgell, A. "SpamSum Overview and code", downloaded from samba.org/ftp/unpacked/junkcode/spamsum, 2002.*

Schleimer, S., D.S. Wilkerson and A. Aiken "Winnowing: Local Algorithms for Document Fingerprinting", SIGMOD 2003, Jun. 9-12, 2003.*

Scheirer, W. and M. Chuah "Comparison of Three Sliding-Window Based Worm Signature Generation Schemes", Technical Paper LU-CSE-05-025, CSE Department, Lehigh University, 2005.*

Kornblum, J. "Identifying Almost Identical Files Using Context Triggered Piecewise Hashing", Digital Investigation, vol. 35, pp. S91-S97.*

Tridgell, Andrew, Efficient Algorithms for Sorting and Synchronization, Apr. 2000, pp. i-viii, pp. 1-106.

Aho, Alfred V., Hopcroft, John E., and Ullman, Jeffrey D., Data Structures and Algorithms, 1983, Chapter 4, Addison-Wesley Publishing Company, Reading, Massachusetts, pp. 107-151.

Hegazy, A.E.F.A. "Searching Large Textual Files for Near Matching Patterns", Dissertation, School of Engineering and Applied Science, George Wahington University, Jul. 24, 1985.

* cited by examiner

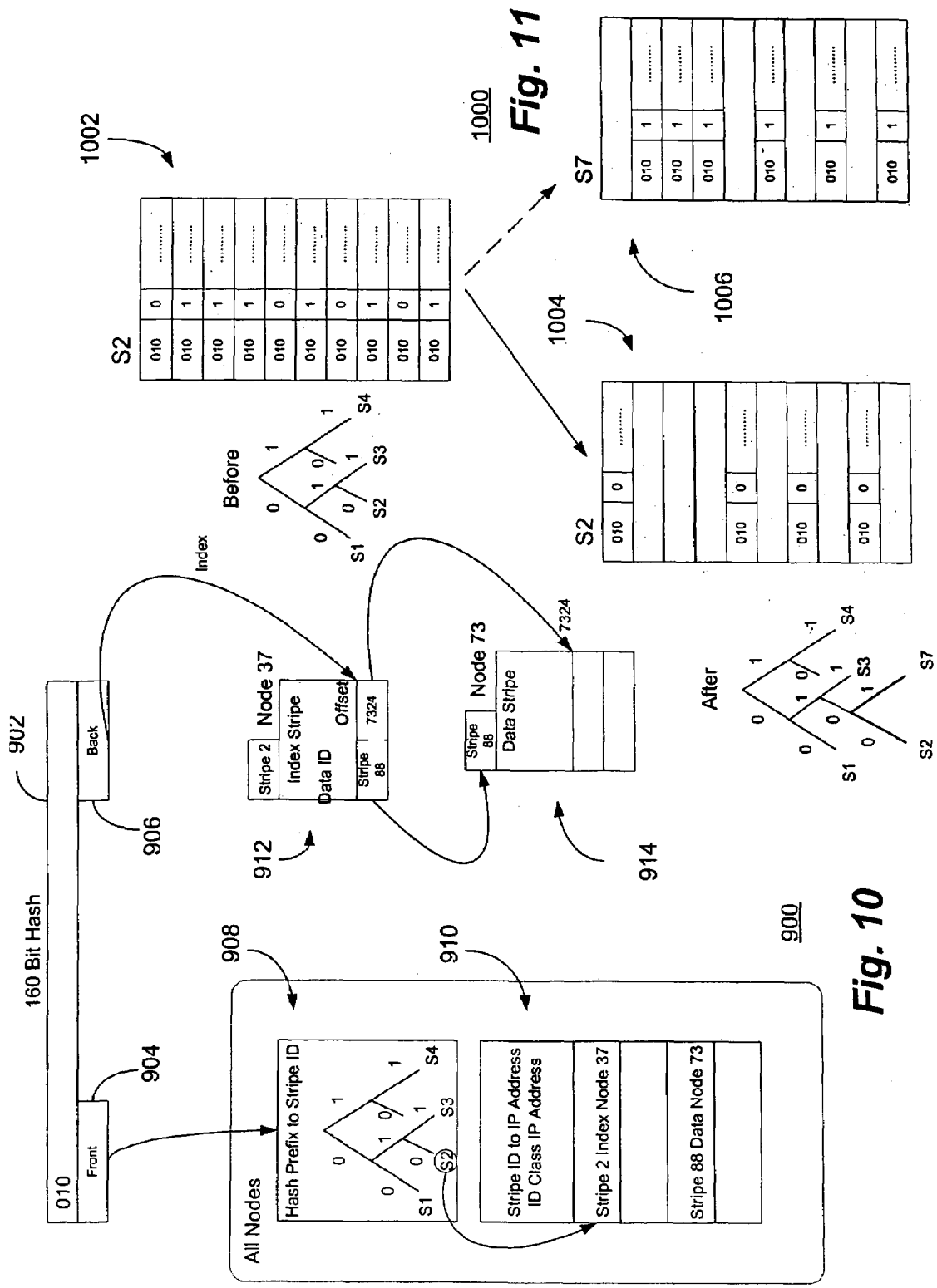

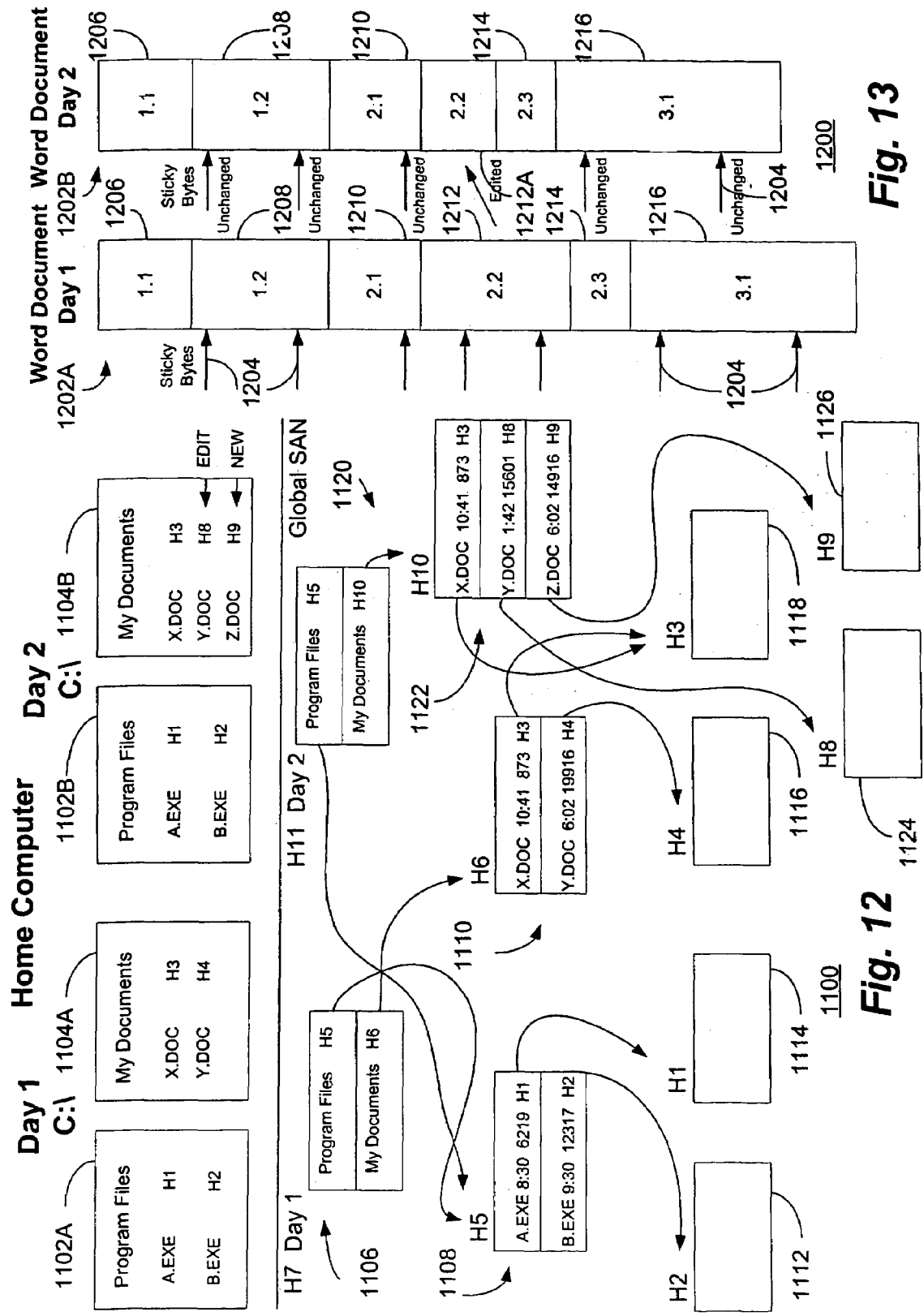

SYSTEM AND METHOD FOR UNORCHESTRATED DETERMINATION OF DATA SEQUENCES USING STICKY BYTE FACTORING TO DETERMINE BREAKPOINTS IN DIGITAL SEQUENCES

CROSS REFERENCE TO RELATED PATENT APPLICATIONS

This application is a continuation of U.S. application Ser. No. 09/777,149 now U.S. Pat. No. 6,810,398, filed Feb. 5, 2001, and issued Oct. 26, 2004, which claims priority from U.S. Provisional Application No. 60/245,920, filed Nov. 6, 2000, the disclosures of which are herein specifically incorporated by this reference.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright©2000, Avamar Technologies.

BACKGROUND OF THE INVENTION

The present invention relates, in general, to the field of systems and methods for the unorchestrated determination of data sequences using "sticky byte" factoring to determine breakpoints in digital sequences. More particularly, the present invention relates to an efficient and effective method of dividing a data set into pieces that generally yields near optimal commonality.

Modern computer systems hold vast quantities of data—on the order of a billion, billion bytes in aggregate. Incredibly, this volume tends to quadruple each year and even the most impressive advances in computer mass storage architectures cannot keep pace.

The data maintained in most computer mass storage systems has been observed to have the following interesting characteristics: 1) it is almost never random and is, in fact, highly redundant; 2) the number of unique sequences in this data sums to a very small fraction of the storage space it actually occupies; 3) a considerable amount of effort is required in attempting to manage this volume of data, with much of that being involved in the identification and removal of redundancies (i.e. duplicate files, old versions of files, purging logs, archiving etc.); and 4) large amounts of capital resources are dedicated to making unnecessary copies, saving those copies to local media and the like.

A system that factored redundant copies would reduce the number of storage volumes otherwise needed by orders of magnitude. However, a system that factors large volumes of data into their common sequences must employ a method by which to determine those sequences. Conventional methods that attempt to compare one data sequence to another typically suffer from extreme computational complexity and these methods can, therefore, only be employed to factor relatively small data sets. Factoring larger data sets is generally only done using simplistic methods such as using arbitrary fixed sizes. These methods factor poorly under many circumstances and the efficient factoring of large data sets has long been a persistent and heretofore intractable problem in the field of computer science.

SUMMARY OF THE INVENTION

Disclosed herein is a system and method for unorchestrated determination of data sequences using "sticky byte" factoring to determine breakpoints in digital sequences such that common sequences can be identified. Sticky byte factoring provides an efficient method of dividing a data set into pieces that generally yields near optimal commonality. As disclosed herein, this may be effectuated by employing a hash function with periodic reset of the hash value or, in a preferred embodiment, a rolling hashsum. Further, in the particular exemplary embodiment disclosed herein, a threshold function is utilized to deterministically set divisions in a digital or numeric sequence, such as a sequence of data. Both the rolling hash and the threshold function are designed to require minimal computation. This low overhead makes it possible to rapidly partition a data sequence for presentation to a factoring engine or other applications that prefer subsequent synchronization across the entire data set.

Among the significant advantages of the system and method disclosed herein is that its calculation requires neither communication nor comparisons (like conventional factoring systems) to perform well. This is particularly true in a distributed environment where, while conventional systems require communication to compare one sequence to another, the system and method of the present invention can be performed in isolation using only the sequence being then considered.

In operation, the system and method of the present invention provides a fully automated means for dividing a sequence of numbers (e.g. bytes in a file) such that common elements may be found on multiple related and unrelated computer systems without the need for communication between the computers and without regard to the data content of the files. Broadly, what is disclosed herein is a system and method for a data processing system which includes a fully automated means to partition a sequence of numeric elements (i.e. a sequence of bytes) so that common sequences may be found without the need for searching, comparing, communicating or coordinating with other processing elements in the operation of finding those sequences. The system and method of the present invention produces "sticky byte" points that partition numeric sequences with a distribution that produces subsequences of the type and size desired to optimize commonality between partitions.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 10 is a simplified diagram illustrative of a hash file system address translation function for an exemplary 160 bit hash value;

FIG. 11 is a simplified exemplary illustration of an index stripe splitting function for use with the system and method of the present invention;

FIG. 12 is a simplified illustration of the overall functionality of the system and method of the present invention for use in the backup of data for a representative home computer having a number of program and document files on Day 1 and wherein one of the document files is edited on Day 2 together with the addition of a third document file;

FIG. 13 illustrates the comparison of various pieces of a particular document file marked by a number of "sticky bytes" both before and following editing wherein one of the pieces is thereby changed while other pieces remain the same.

DESCRIPTION OF A REPRESENTATIVE EMBODIMENT

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

Figure 1:
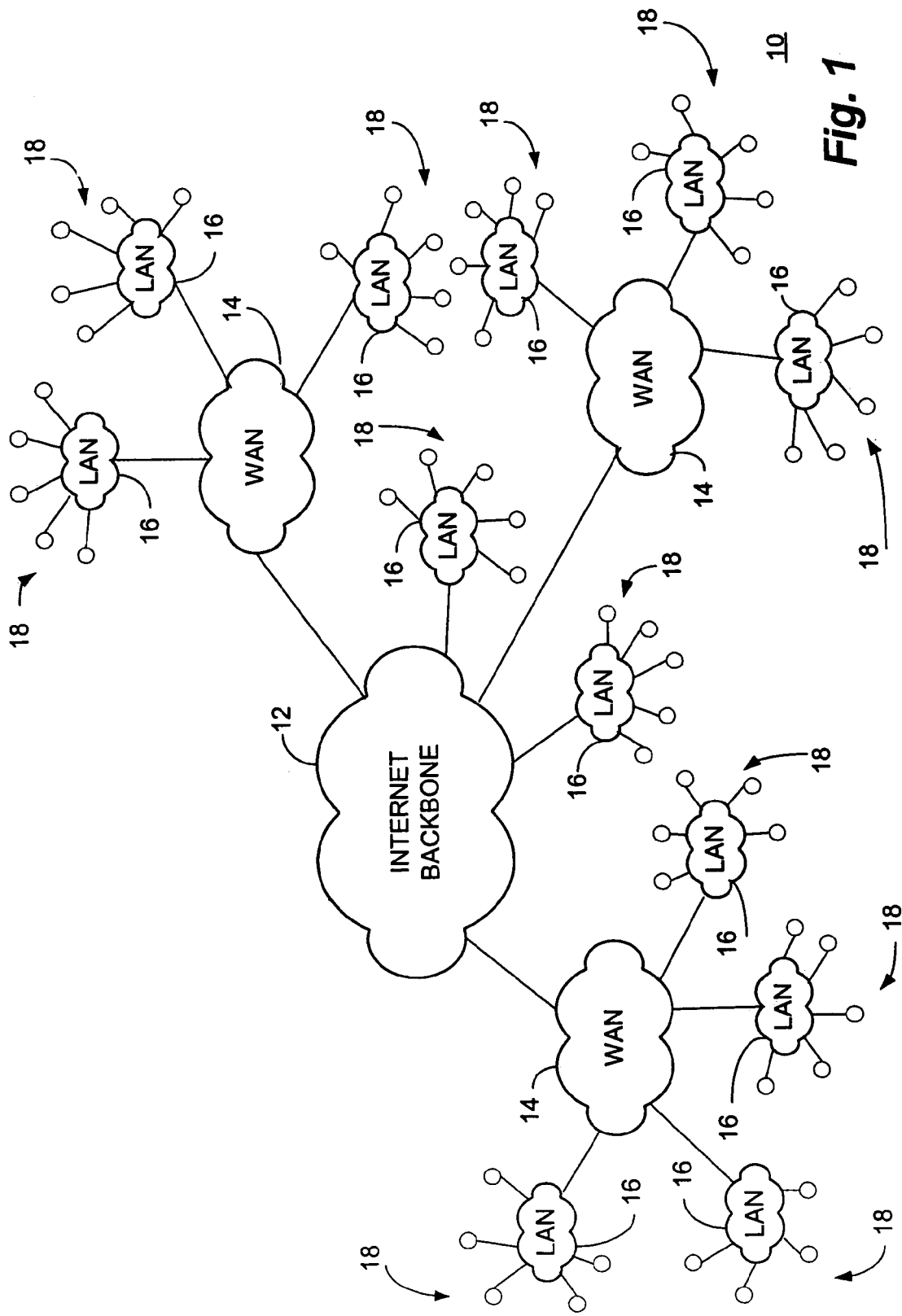
FIG. 1 is a high level illustration of a representative networked computer environment in which the system and method of the present invention may be implemented.

With reference now to FIG. 1, the present invention may be utilized in conjunction with a novel data storage system on a network 10. In this figure, an exemplary internetwork environment 10 may include the Internet which comprises a global internetwork formed by logical and physical connection between multiple wide area networks ("WANs") 14 and local area networks ("LANs") 16. An Internet backbone 12 represents the main lines and routers that carry the bulk of the data traffic. The backbone 12 is formed by the largest networks in the system that are operated by major Internet service providers ("ISPs") such as GTE, MCI, Sprint, UUNet, and America Online, for example. While single connection lines are used to conveniently illustrate WANs 14 and LANs 16 connections to the Internet backbone 12, it should be understood that in reality, multi-path, routable physical connections exist between multiple WANs 14 and LANs 16. This makes internetwork 10 robust when faced with single or multiple failure points.

A "network" comprises a system of general purpose, usually switched, physical connections that enable logical connections between processes operating on nodes 18. The physical connections implemented by a network are typically independent of the logical connections that are established between processes using the network. In this manner, a heterogeneous set of processes ranging from file transfer, mail transfer, and the like can use the same physical network. Conversely, the network can be formed from a heterogeneous set of physical network technologies that are invisible to the logically connected processes using the network. Because the logical connection between processes implemented by a network is independent of the physical connection, internetworks are readily scaled to a virtually unlimited number of nodes over long distances.

In contrast, internal data pathways such as a system bus, peripheral component interconnect ("PCI") bus, Intelligent Drive Electronics ("IDE") bus, small computer system interface ("SCSI") bus, and the like define physical connections that implement special-purpose connections within a computer system. These connections implement physical connections between physical devices as opposed to logical connections between processes. These physical connections are characterized by limited distance between components, limited number of devices that can be coupled to the connection, and constrained format of devices that can be connected over the connection.

In a particular implementation of the present invention, storage devices may be placed at nodes 18. The storage at any node 18 may comprise a single hard drive, or may comprise a managed storage system such as a conventional RAID device having multiple hard drives configured as a single logical volume. Significantly, the present invention manages redundancy operations across nodes, as opposed to within nodes, so that the specific configuration of the storage within any given node is less relevant. Optionally, one or more of the nodes 18 may implement storage allocation management ("SAM") processes that manage data storage across nodes 18 in a distributed, collaborative fashion. SAM processes preferably operate with little or no centralized control for the system as whole. SAM processes provide data distribution across nodes 18 and implement recovery in a fault-tolerant fashion across network nodes 18 in a manner similar to paradigms found in RAID storage subsystems.

However, because SAM processes operate across nodes rather than within a single node or within a single computer, they allow for greater fault tolerance and greater levels of storage efficiency than conventional RAID systems. For example, SAM processes can recover even when a network node 18, LAN 16, or WAN 14 becomes unavailable. Moreover, even when a portion of the Internet backbone 12 becomes unavailable through failure or congestion the SAM processes can recover using data distributed on nodes 18 that remain accessible. In this manner, the present invention leverages the robust nature of internetworks to provide unprecedented availability, reliability, fault tolerance and robustness.

Figure 2:
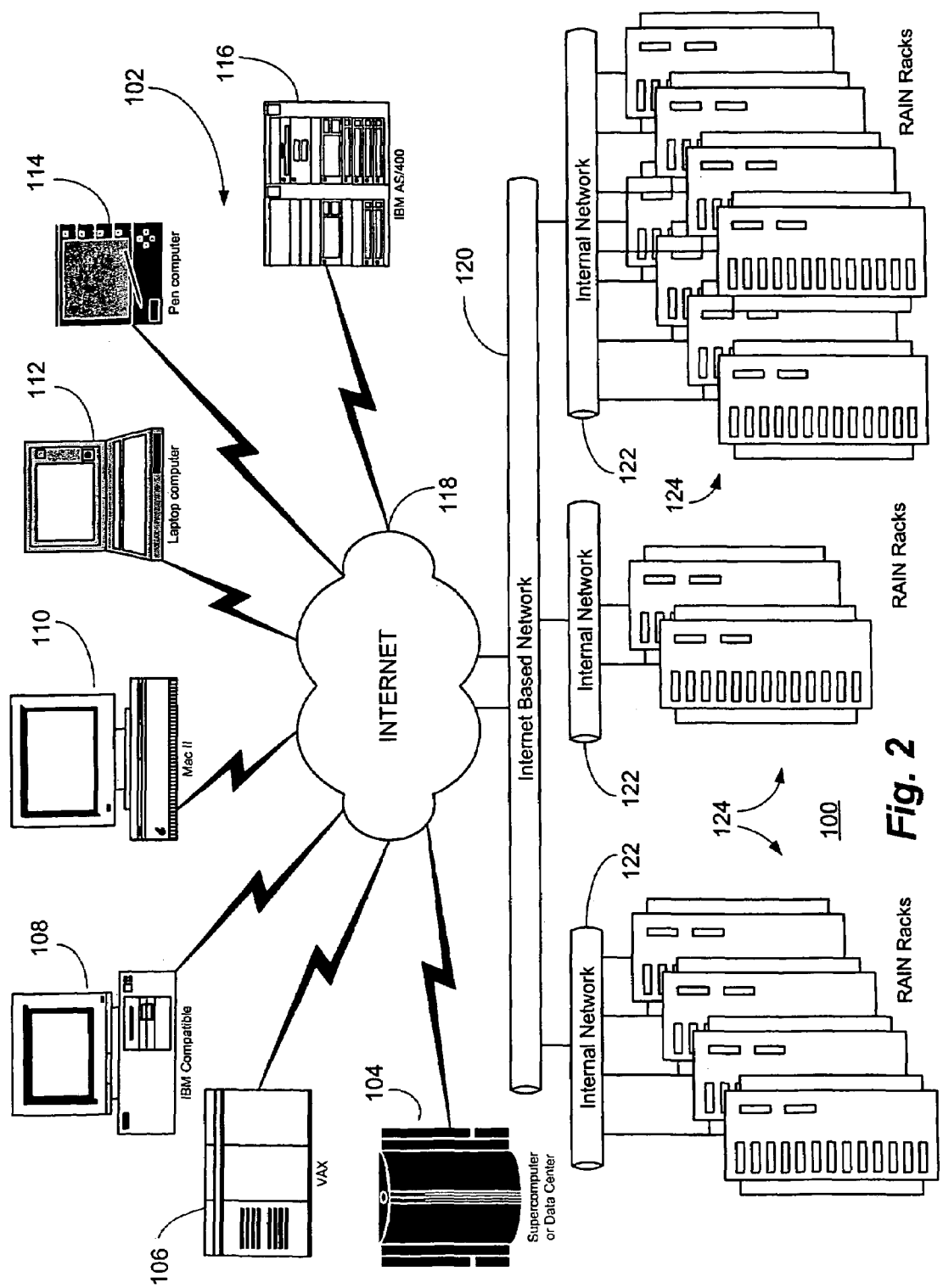
FIG. 2 is a more detailed conceptual representation of a possible operating environment for utilization of the system and method of the present invention wherein files maintained on any number of computers or data centers may be stored in a decentralized computer system through an Internet connection to a number of Redundant Arrays of Independent Nodes ("RAIN") racks located, for example, at geographically diverse locations.

With reference additionally now to FIG. 2, a more detailed conceptual view of an exemplary network computing environment in which the present invention is implemented is depicted. The Internetwork 10 of the preceding figure (or Internet 118 in this figure) enables an interconnected network 100 of a heterogeneous set of computing devices and mechanisms 102 ranging from a supercomputer or data center 104 to a hand-held or pen-based device 114. While such devices have disparate data storage needs, they share an ability to retrieve data via network 100 and operate on that data within their own resources. Disparate computing devices 102 including mainframe computers (e.g., VAX station 106 and IBM AS/400 station 116) as well as personal computer or workstation class devices such as IBM compatible device 108, Macintosh device 110 and laptop computer 112 are readily interconnected via internetwork 10 and network 100. Although not illustrated, mobile and other wireless devices may be coupled to the internetwork 10.

Internet-based network 120 comprises a set of logical connections, some of which are made through Internet 118, between a plurality of internal networks 122. Conceptually, Internet-based network 120 is akin to a WAN 14 (FIG. 1) in that it enables logical connections between geographically distant nodes. Internet-based networks 120 may be implemented using the Internet 118 or other public and private WAN technologies including leased lines, Fibre Channel, frame relay, and the like.

Similarly, internal networks 122 are conceptually akin to LANs 16 (FIG. 1) in that they enable logical connections across more limited stance than WAN 14. Internal networks 122 may be implemented using various LAN technologies including Ethernet, Fiber Distributed Data Interface ("FDDI"), Token Ring, Appletalk, Fibre Channel, and the like.

Each internal network 122 connects one or more redundant arrays of independent nodes (RAIN) elements 124 to implement RAIN nodes 18 (FIG. 1). Each RAIN element 124 comprises a processor, memory, and one or more mass storage devices such as hard disks. RAIN elements 124 also include hard disk controllers that may be conventional IDE or SCSI controllers, or may be managing controllers such as RAID controllers. RAIN elements 124 may be physically dispersed or co-located in one or more racks sharing resources such as cooling and power. Each node 18 (FIG. 1) is independent of other nodes 18 in that failure or unavailability of one node 18 does not affect availability of other nodes 18, and data stored on one node 18 may be reconstructed from data stored on other nodes 18.

In a particular exemplary implementation, the RAIN elements 124 may comprise computers using commodity components such as Intel-based microprocessors mounted on a motherboard supporting a PCI bus and 256 megabytes of random access memory ("RAM") housed in a conventional AT or ATX case. SCSI or IDE controllers may be implemented on the motherboard and/or by expansion cards connected to the PCI bus. Where the controllers are implemented only on the motherboard, a PCI expansion bus may be optionally used. In a particular implementation, the motherboard may implement two mastering EIDE channels and a PCI expansion card which is used to implement two additional mastering EIDE channels so that each RAIN element 124 includes up to four or more EIDE hard disks. In the particular implementation, each hard disk may comprise an 80 gigabyte hard disk for a total storage capacity of 320 gigabytes or more per RAIN element. The hard disk capacity and configuration within RAIN elements 124 can be readily increased or decreased to meet the needs of a particular application. The casing also houses supporting mechanisms such as power supplies and cooling devices (not shown).

Each RAIN element 124 executes an operating system. In a particular implementation, a UNIX or UNIX variant operating system such as Linux may be used. It is contemplated, however, that other operating systems including DOS, Microsoft Windows, Apple Macintosh OS, OS/2, Microsoft Windows NT and the like may be equivalently substituted with predictable changes in performance. The operating system chosen forms a platform for executing application software and processes, and implements a file system for accessing mass storage via the hard disk controller(s). Various application software and processes can be implemented on each RAIN element 124 to provide network connectivity via a network interface using appropriate network protocols such as User Datagram Protocol ("UDP"), Transmission Control Protocol (TCP), Internet Protocol (IP) and the like.

Figure 3:
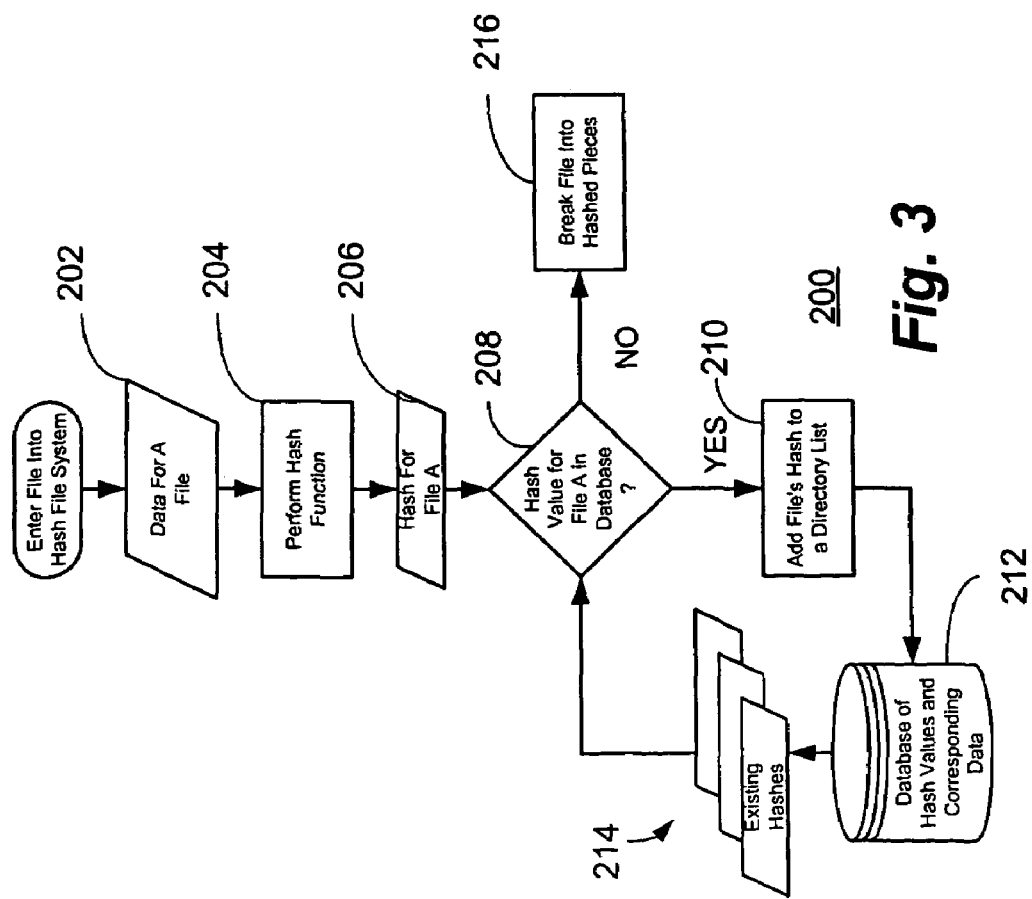
FIG. 3 is logic flow chart depicting the steps in the entry of a computer file into the hash file system of the present invention wherein the hash value for the file is checked against hash values for files previously maintained in a set, database.

With reference additionally now to FIG. 3, a logic flow chart is shown depicting the steps in the entry of a computer file into the hash file system of the present invention and wherein the hash value for the file is checked against hash values for files previously maintained in a set or database. Any digital sequence could also be entered into the hash file system of the present invention in much the same way, but the current example wherein the digital sequence entered consists of a computer file is instructive.

The process 200 begins by entry of a computer file data 202 (e.g. "File A") into the hash file system ("HFS") of the present invention upon which a hash function is performed at step 204. The data 206 representing the hash of File A is then compared to the contents of a set containing hash file values at decision step 208. If the data 206 is already in the set, then the file's hash value is added to a hash recipe at step 210. This hash recipe consists of the data and associated structures needed to reconstruct a file, directory, volume, or entire system depending on the class of computer file data entered into the system. The contents of the set 212 comprising hash values and corresponding data is provided in the form of existing hash values 214 for the comparison operation of decision step 208. On the other hand, if the hash value for File A is not currently in the set, the file is broken into hashed pieces (as will be more fully described hereinafter) at step 216.

Figure 4:
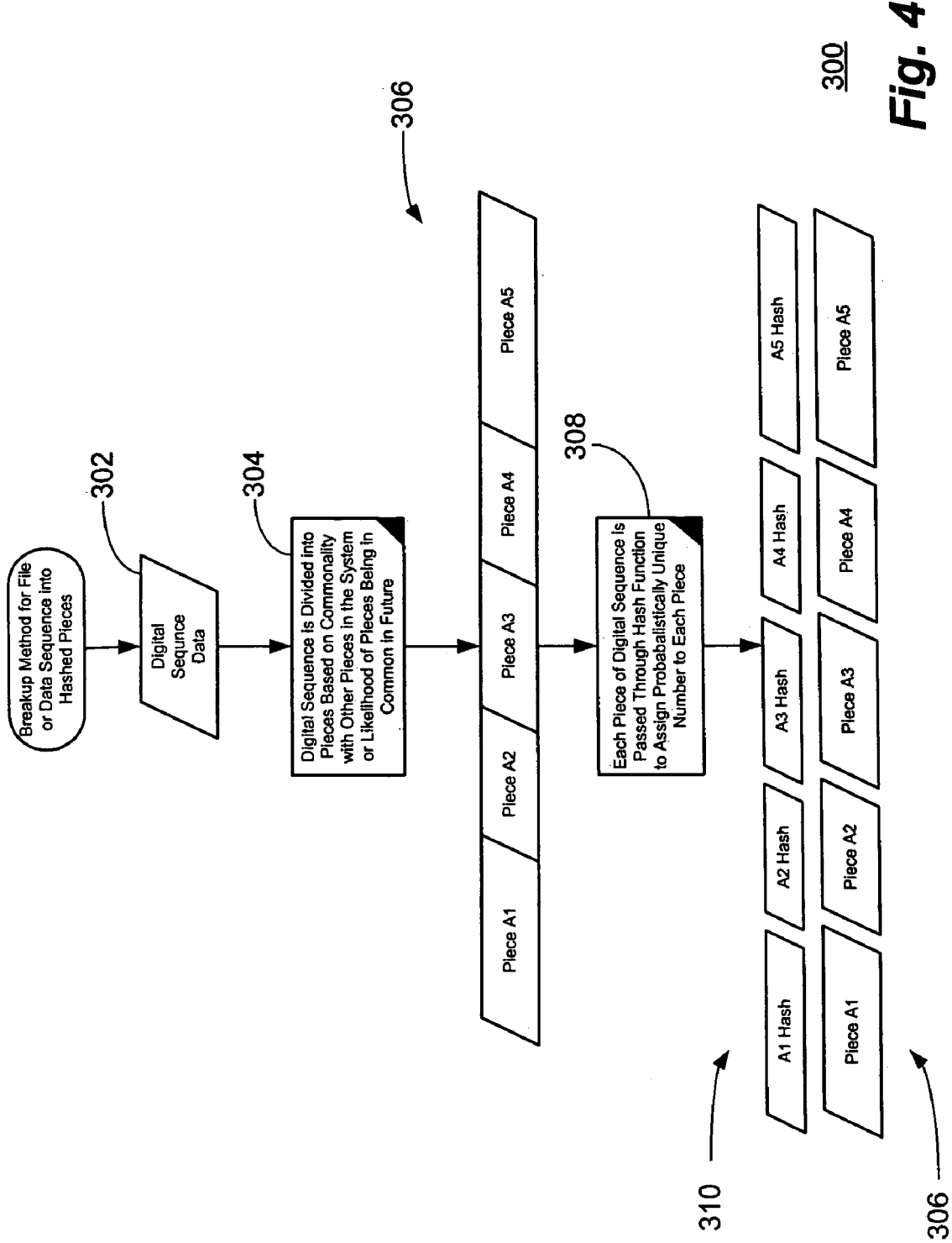
FIG. 4 is a further logic flow chart depicting the steps in the breakup of a file or other data sequence into hashed pieces resulting in the production of a number of data pieces as well as corresponding probabilistically unique hash values for each piece.

With reference additionally now to FIG. 4, a further logic flow chart is provided depicting the steps in the process 300 for breakup of a digital sequence (e.g. a file or other data sequence) into hashed pieces. This process 300 ultimately results in the production of a number of data pieces as well as corresponding probabilistically unique hash values for each piece.

The file data 302 is divided into pieces based on commonality with other pieces in the system or the likelihood of pieces being found to be in common in the future at step 304. The results of the operation of step 304 upon the file data 302 is, in the representative example shown, the production of five file pieces 306 denominated A1 through A5 inclusively. Each of the file pieces 306 is then operated on at step 308 by placing it through individual hash function operations to assign a probabilistically unique number to each of the pieces 306 A1 through A5. The result of the operation at step 308 is that each of the pieces 306 (A1 through A5) has an associated, probabilistically unique hash value 310 (shown as A1 Hash through A5 Hash respectively). The file division process of step 304 is described in greater detail hereinafter in conjunction with the unique "sticky byte" operation also disclosed herein.

Figure 5:
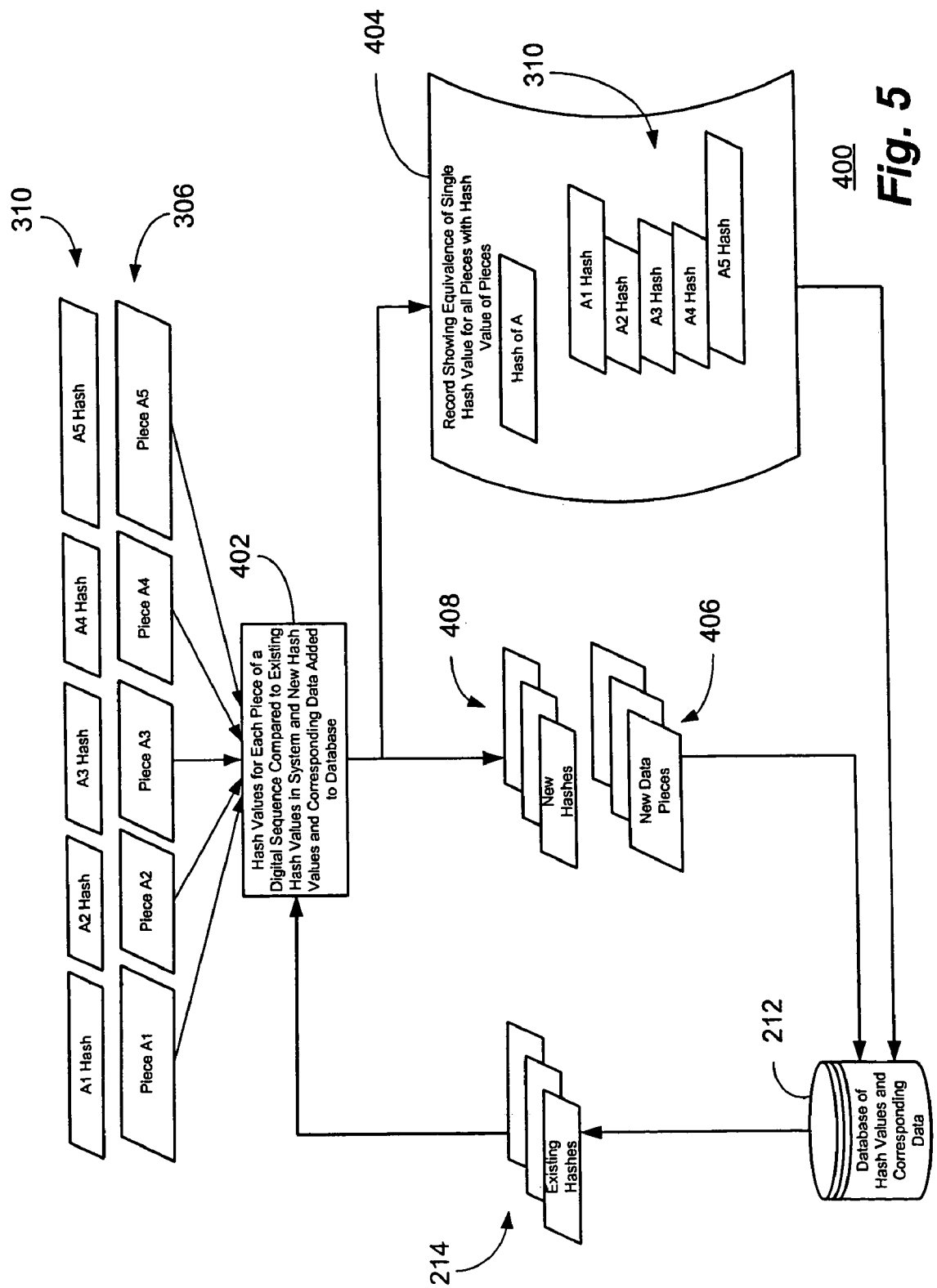
FIG. 5 is another logic flow chart depicting the comparison of the hash values for each piece of a file to existing hash values in the set or database, the production of records showing the equivalence of a single hash value for all file pieces with the hash values of the various pieces and whereupon new data pieces and corresponding new hash values are added to the set.

With reference additionally now to FIG. 5, another logic flow chart is shown depicting a comparison process 400 for the hash values 310 of each piece 306 of the file to those of existing hash values 214 maintained in the set 212. Particularly, at step 402, the hash values 310 for each piece 306 of the file are compared to existing hash values 214 and new hash values 408 and corresponding new data pieces 406 are added to the set 212. In this way, hash values 408 not previously present in the set 212 are added together with their associated data pieces 406. The process 400 also results in the production of records 404 showing the equivalence of a single hash value for all file pieces with the hash values 310 of the various pieces 306.

Figure 6:
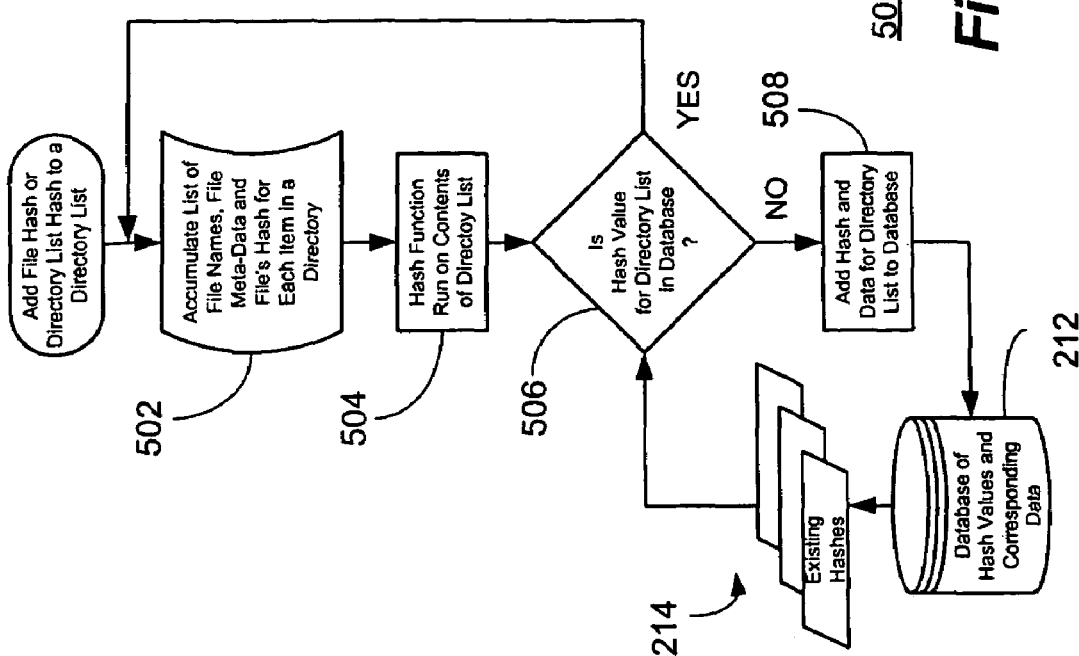
FIG. 6 is yet another logic flow chart illustrating the steps in the comparison of file hash or directory list hash values to existing directory list hash values and the addition of new file or directory list hash values to the set directory list.

With reference additionally now to FIG. 6, yet another logic flow chart is shown illustrating a process 500 for the comparison of file hash or directory list hash values to existing directory list hash values and the addition of new file or directory list hash values to the set directory list. The process 500 operates on stored data 502 which comprises an accumulated list of file names, file meta-data (e.g. date, time, file length, file type etc.) and the file's hash value for each item in a directory. At step 504, the hash function is run upon the contents of the directory list. Decision step 506 is operative to determine whether or not the hash value for the directory list is in the set 212 of existing hash values 214. If it is, then the process 500 returns to add another file hash or directory list hash to a directory list. Alternatively, if the hash value for the directory list is not already in the set 212, the hash value and data for the directory list are added to the set 212 at step 508.

Figure 7:
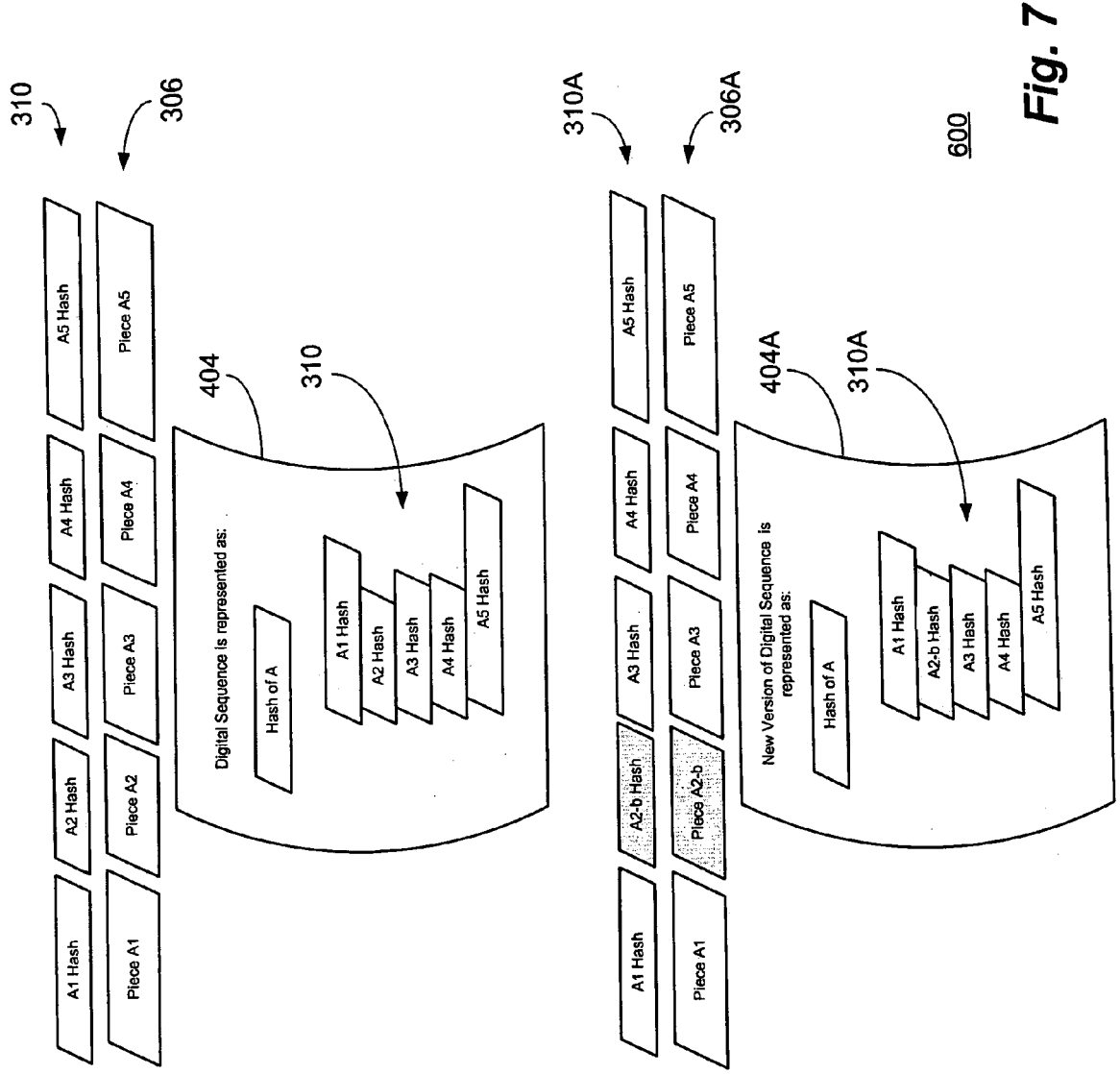
FIG. 7 is a comparison of the pieces of a representative computer file with their corresponding hash values both before and after editing of a particular piece of the exemplary file.

With reference additionally now to FIG. 7, a comparison 600 of the pieces 306 of a representative computer file (i.e. "File A") with their corresponding hash values 310 is shown both before and after editing of a particular piece of the exemplary file. In this example, the record 404 contains the hash value of File A as well as the hash values 310 of each of the pieces of the file A1 through A5. A representative edit or modification of the File A may produce a change in the data for piece A2 (now represented by A2-b) of the file pieces 306A along with a corresponding change in the hash value A2-b of the hash values 310A. The edited file piece now produces an updated record 404A that includes the modified hash value of File A and the modified hash value of piece A2-b.

Figure 8:
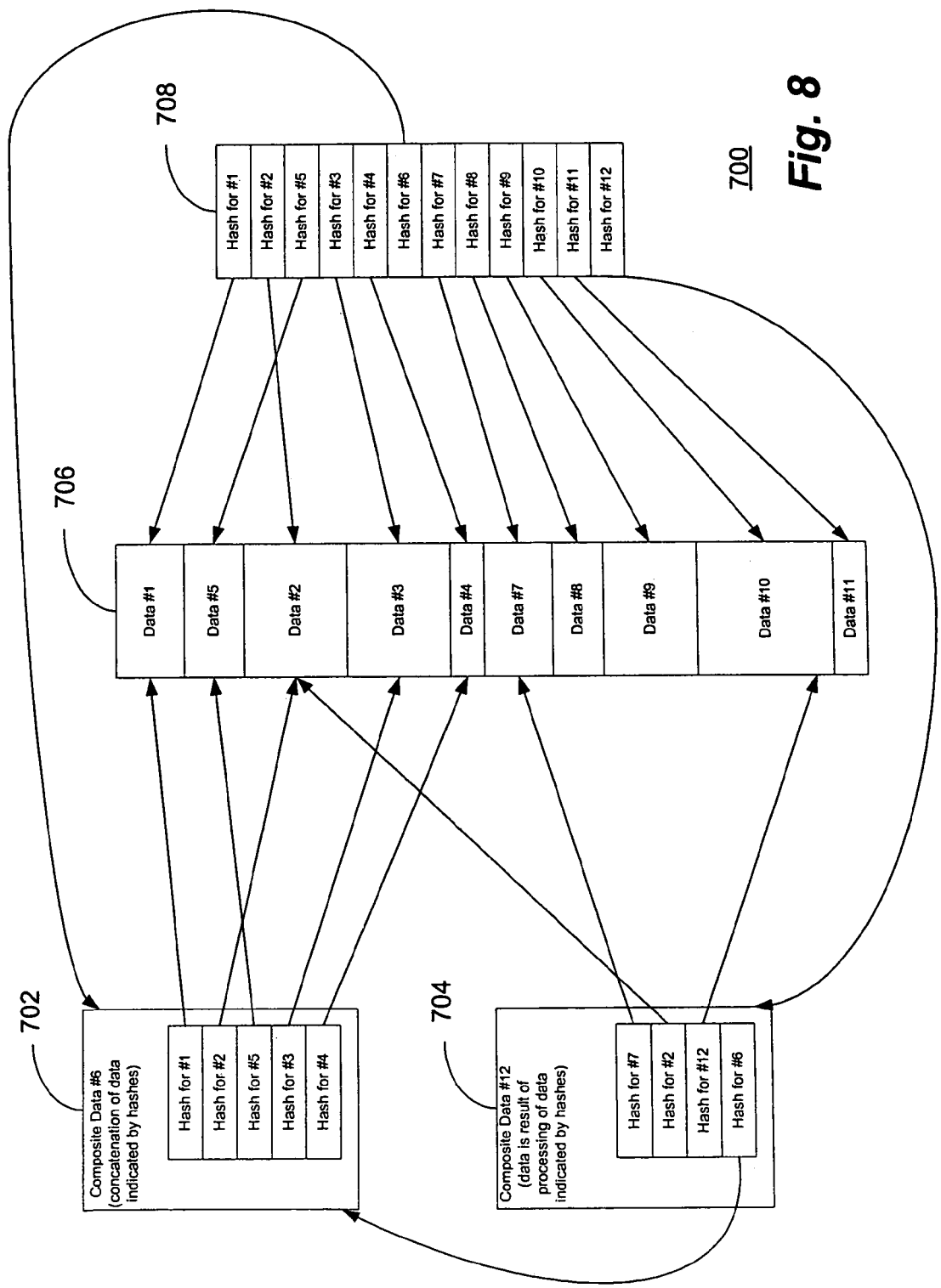
FIG. 8 is a conceptual representation of the fact that composite data which may be derived by means of the system and method of the present invention is effectively the same as the data represented explicitly but may instead be created by a "recipe" such as the concatenation of data represented by its corresponding hashes or the result of a function using the data represented by the hashes.

With reference additionally now to FIG. 8, a conceptual representation 700 is shown illustrative of the fact that composite data (such as composite data 702 and 704) derived by means of the system and method of the present invention, is effectively the same as the data 706 represented explicitly but is instead created by a "recipe", or formula. In the example shown, this recipe includes the concatenation of data represented by its corresponding hashes 708 or the result of a function using the data represented by the hashes. The data blocks 706 may be variable length quantities as shown and the hash values 708 are derived from their associated data blocks. As previously stated, the hash values 708 are a probabilistically unique identification of the corresponding data pieces but truly unique identifications can be used instead or intermixed therewith. It should also be noted that the composite data 702, 704 can also reference other composite data many levels deep while the hash values 708 for the composite data can be derived from the value of the data the recipe creates or the hash value of the recipe itself.

Figure 9:
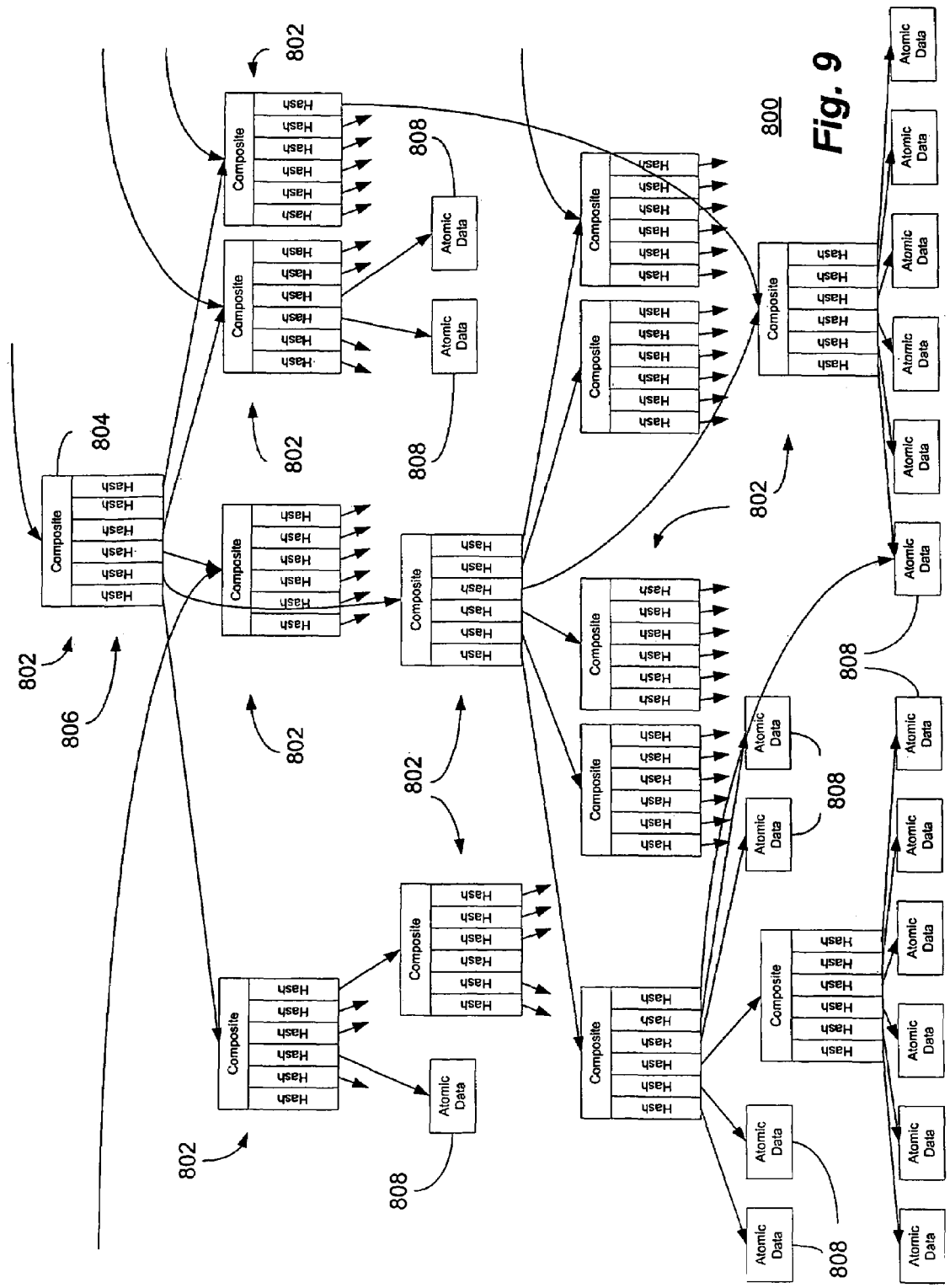
FIG. 9 is another conceptual representation of how the hash file system and method of the present invention my be utilized to organize data to optimize the reutilization of redundant sequences through the use of hash values as pointers to the data they represent and wherein data may be represented either as explicit byte sequences (atomic data) or as groups of sequences (composites)

With reference additionally now to FIG. 9, another conceptual representation 800 is shown of how a hash file system and method may be utilized to organize data 802 to optimize the reutilization of redundant sequences through the use of hash values 806 as pointers to the data they represent and wherein data 802 may be represented either as explicit byte sequences (atomic data) 808 or as groups of sequences (composites) 804.

The representation 800 illustrates the tremendous commonality of recipes and data that gets reused at every level. The basic structure of the hash file system of the present invention is essentially that of a "tree" or "bush" wherein the hash values 806 are used instead of conventional pointers. The hash values 806 are used in the recipes to point to the data or another hash value that could also itself be a recipe. In essence then, recipes can point to other recipes that point to still other recipes that ultimately point to some specific data that may, itself, point to other recipes that point to even more data, eventually getting down to nothing but data.

With reference additionally now to FIG. 10, a simplified diagram 900 is shown illustrative of a hash file system address translation function for an exemplary 160 bit hash value 902. The hash value 902 includes a data structure comprising a front portion 904 and a back portion 906 as shown and the diagram 900 illustrates a particular "0 (1)" operation that is used for enabling the use of the hash value 902 to go to the location of the particular node in the system that contains the corresponding data.

The diagram 900 illustrates how the front portion 904 of the hash value 902 data structure may be used to indicate the hash prefix to stripe identification ("ID") 908 and how that is, in turn, utilized to map the stripe ID to IP address and the ID class to IP address 910. In this example, the "S2" indicates stripe 2 of index Node 37 912. The index stripe 912 of Node 37 then indicates stripe 88 of data Node 73 indicated by the reference numeral 914. In operation then, a portion of the hash value 902 itself may be used to indicate which node in the system contains the relevant data, another portion of the hash value 902 may be used to indicate which stripe of data at that particular node and yet another portion of the hash value 902 to indicate where within that stripe the data resides. Through this three step process, it can rapidly be determined if the data represented by the hash value 902 is already present in the system.

With reference additionally now to FIG. 11, a simplified exemplary illustration of an index stripe splitting function 1000 is shown for use with the system and method of the present invention. In this illustration, an exemplary function 1000 is shown that may be used to effectively split a stripe 1002 (S2) into two stripes 1004 (S2) and 1006 (S7) should one stripe become too full. In this example, the odd entries have been moved to stripe 1006 (S7) while the even ones remain in stripe 1004. This function 1000 is one example of how stripe entries may be handled as the overall system grows in size and complexity.

With reference additionally now to FIG. 12, a simplified illustration 1100 of the overall functionality of the system and method of the present invention is shown for use, for example, in the backup of data for a representative home computer having a number of program and document files 1102A and 1104A on Day 1 and wherein the program files 1102B remain the same on Day 2 while one of the document files 1104B is edited on Day 2 (Y.doc) together with the addition of a third document file (Z.doc).

The illustration 1100 shows the details of how a computer file system may be broken into pieces and then listed as a series of recipes on a global data protection network ("gDPN") to reconstruct the original data from the pieces. This very small computer system is shown in the form of a "snapshot" on "Day 1" and then subsequently on "Day 2". On "Day 1", the "program files H5" and "my documents H6" are illustrated by numeral 1106, with the former being represented by a recipe 1108 wherein a first executable file is represented by a hash value H1 1114 and a second represented by a hash value H2 1112. The document files are represented by hash value H6 1110 with the first document being represented by hash value H3 1118 and the second by hash value H4 1116. Thereafter on "Day 2", the "program files H5" and "my documents" H10 indicated by numeral 1120 show that the "program files H5" have not changed, but the "my document H10" have. H10 indicated by numeral 1122 shows the "X.doc" is still represented by hash value H3 1118 while "Y.doc" is now represented by hash value H8 at number 1124. New document file "Z.doc" is now represented by hash value H9 at numeral 1126.

In this example, it can be seen that on Day 2, some of the files have changed, while others have not. In the files that have changed, some of the pieces of them have not changed while other pieces have. Through the use of the hash file system of the present invention, a "snap shot" of the computer system can be made on Day 1 (producing the necessary recipes for reconstruction of the computer files as they exist then) and then on Day 2 through the reuse of some of the previous day's recipes together with the reformulation of others and the addition of new ones to describe the system at that time. In this manner, the files that together constitute the computer system may be recreated in their entirety at any point in time on Day 1 and Day 2 for which a snapshot was taken, as well as from snapshots taken on any subsequent day. Thus any version of a computer file committed to the hash file system of the current invention can be retrieved from the system at any time after it has been initially committed.

With reference additionally now to FIG. 13, a comparison 1200 of various pieces of a particular document file marked by a number of "sticky bytes" 1204 is shown both before (Day 1 1202A) and following editing (Day 2 1202B) wherein one of the pieces is thereby changed while other pieces remain the same. For example, on Day 1, file 1202A comprises variable length pieces 1206 (1.1), 1208 (1.2), 1210 (2.1), 1212 (2.), 1214 (2.3) and 1216 (3.1). On Day 2, pieces 1206, 1208, 1210, 1214 and 1216 remain the same (thus having the same hash values) while piece 1212 has now been edited to produce piece 1212A (thus having a differing hash value).

Figure 14:
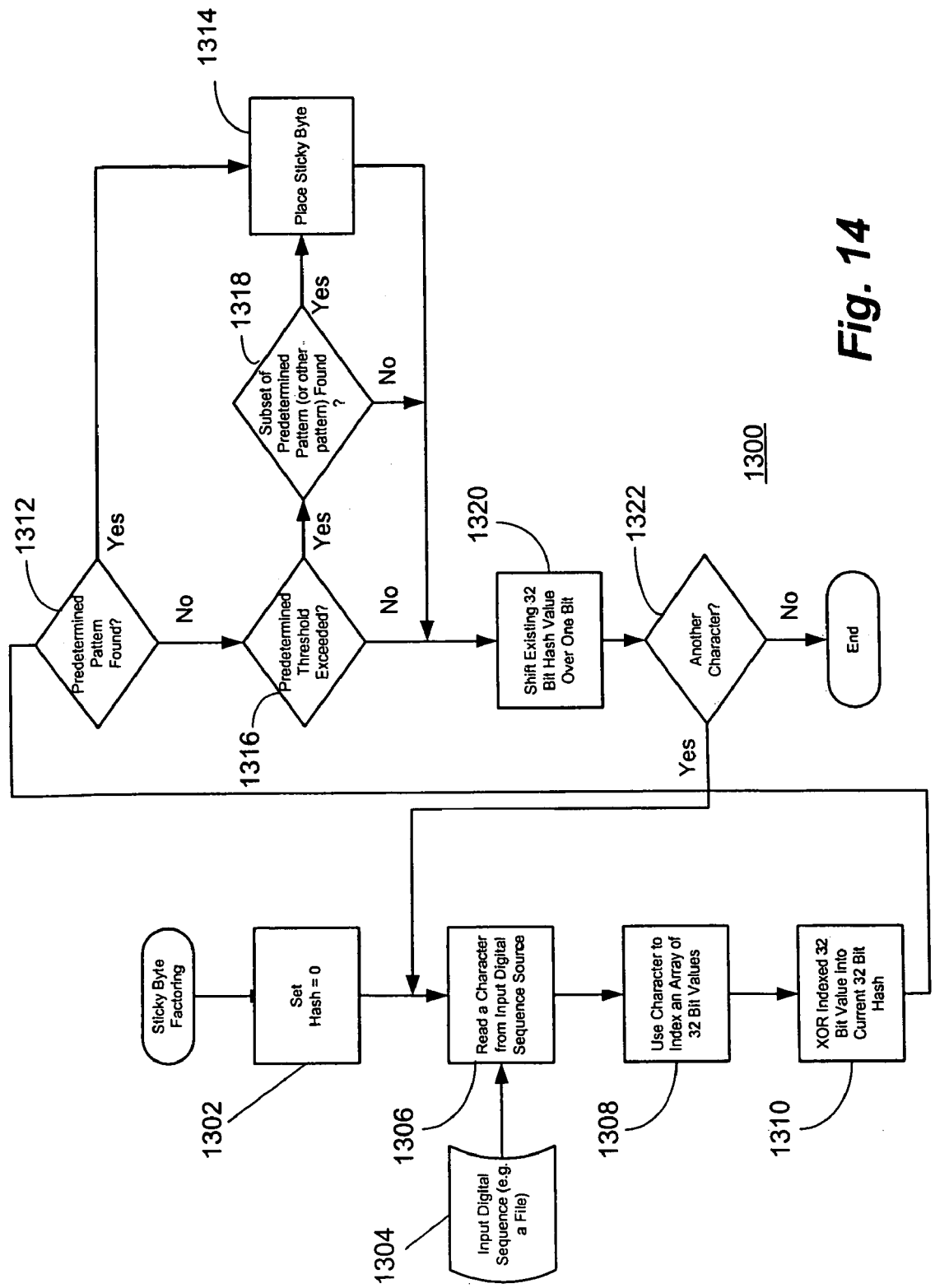
FIG. 14 is a representative flow chart for an exemplary sticky byte factoring process in accordance with the present invention.

With reference additionally now to FIG. 14, a representative sticky byte (or sticky point) factoring process 1300 is illustrated for possible use in the implementation of the present invention. The process 1300 begins by setting the hash value to "0" at step 1302 to initialize the process.

A data object 1304, comprising the contents of an input computer file, is acted upon at step 1306 wherein a character from the input file source is read. At step 1308, the character read at step 1306 is utilized to index an array of 32 bit values (this size array is described for purposes of example only). Thereafter, at step 1310, the indexed 32 bit value found at step 1308 is exclusive OR'd ("XOR'd") into the current 32 bit hash value.

At decision step 1312, if the predetermined pattern is found (e.g. a selected number of least significant bit "0's"), then the sticky byte is placed in the input file at that point at step 1314. In some embodiments, eleven bits are used for the least significant bits or endmost bits of the predetermined numeric pattern, and in these embodiments, the eleven bits may be "0". In some cases, the method 1300 includes, as explained below, establishing a second predetermined numeric pattern when the threshold is met. The second predetermined numeric pattern may be a bit pattern which is a subset of the first predetermined pattern. In specific examples of the method 1300, the first numeric pattern may include a consecutive sequence of eleven bits while the second numeric pattern may include ten of the eleven bits of the first numeric pattern. For example, the first numeric pattern may include eleven consecutive "0"'s and the second numeric pattern may include ten consecutive "0"'s. If the predetermined pattern is not found at decision step 1312, then, at decision step 1316, a determination is made as to whether a predetermined threshold number of characters in the input file (having been operated on by the rolling hash function of process 1300, as will be more fully described hereinafter) has been exceeded. If the predetermined threshold number has been exceeded, then the process 1300 proceeds to decision step 1318 to see if some subset number of the predetermined pattern (e.g. a smaller selected number of least significant bit "0's") being searched for in decision step 1312 has been found. If so, then the sticky byte is placed at step 1314. In some embodiments, the hash function is selected to produce preferential hashsums that do not uniformly cover the range of the possible output values. In other cases, the hash function is selected or modified dynamically during the execution of the hash function. In yet other cases, the hash function includes the relative or absolute value of the current location as an input value in the hash function resulting in hash values that are affected by the relative or absolute value of the current location.

Alternatively, if at decision step 1316 the predetermined threshold has not been exceeded, the process 1300 proceeds to step 1320 wherein the existing 32 bit hash value is shifted over one bit position (either "right" or "left"). At decision step 1322, if there is still another character to be operated upon by the process 1300, a next character in the input file source is read at step 1306. If at decision step 1318, the subset of the predetermined pattern is not found, or at step 1314 the sticky byte has been placed, the process proceeds to step 1320 as previously described.

Data sticky bytes (or "sticky points") are a unique, fully automated way to sub-divide computer files such that common elements may be found on multiple related and unrelated computers without the need for communication between the computers. The means by which data sticky points are found is completely mathematical in nature and performs equally well regardless of the data content of the files. Through the use of a hash file system, all data objects may be indexed, stored and retrieved using, for example, but not limited to an industry standard checksum such as: MD4, MD5, SHA, or SHA-1. In operation, if two files have the same checksum, it may be considered to be highly likely that they are the same file. Using the system and method disclosed herein, data sticky points may be produced with a standard mathematical distribution and with standard deviations that are a small percentage of the target size.

A data sticky point is a statistically infrequent arrangement of n bytes. In this case, an example is given with 32 bits because of its ease in implementation for current 32-bit oriented microprocessor technology. While the hashing function utilized to implement the hash file system requires a moderately complex computation, it is well within the capability of present day computer systems. Hashing functions are inherently probabilistic and any hashing function can produce the same results for two different data objects. However, the system and method herein disclosed mitigates this problem by using well known and researched hashing functions that reduce the probability of collision down to levels acceptable for reliable use (i.e. one chance in a trillion trillion), far less than the error rates otherwise tolerated in conventional computer hardware operation.

For purposes of more fully explaining the sticky byte factoring system of the present invention, the following definitions pertain:

Rolling Hash:

A rolling hash function preserves the essential nature of a normal hash function but is designed to have limited memory of its input values. Specifically it is a hash function with these properties:

1. It has a fixed or variable length window (sequence length).

2. It produces the same value given the same window of data; that is, it is deterministic. Ideally the hashsums produced uniformly span the entire range of legal values.

3. Its hashsum is unaffected by the data either before or after the window.

In a particular implementation of the present invention, a 32-bit rolling hash function may be used. Its general operation is: 1) shift the existing 32-bit hash value over one bit (either left or right); 2) read a character from the input file source; 3) use that character to index an array of 32-bit values; and 4) XOR the indexed 32-bit value into the current 32-bit hash. The operation then repeats.

The rolling hash value then remains a 32-bit value and all 32 bits are affected by the XOR operation. In the shifting phase, one of the bits is moved out of the rolling hash "window" leaving the remaining 31 bits moved over one place but otherwise unchanged. The effect of this is to move the window over one unit.

It should be noted that a 64-bit (or other size) rolling hashes may be used although the additional computational effort may not be required in the determination of "sticky bytes" since only a small number of bits are generally used by many applications, e.g. some number of the least significant "0"s. For a 32-bit number, the maximum number of zeros is, of course, 32, which would occur only once every 4 billion characters on average—assuming the function utilized produces well distributed numbers. Four billion characters is approximately four gigabytes of data; a large "chunk". Using 64-bit hash values would aid in producing even larger chunk sizes, but since the particular implementation of the present invention herein disclosed uses about a 2K chunk size, the full range of a 32-bit rolling hash is seldom required.

Consider the following C language example, wherein: "f" is an array of bytes, "i" is the index into that array, and "hash" is the hashsum being computed. A simple rolling hash might be written as:

hash=(hash<<1)^f[i];

This hash can be improved by including a second array "scramble" indexed by the input byte values (0 through 255) which produces large randomized integer values:

hash=(hash>>1)|scramble[f[i]];

This example of a rolling hash function produces fairly uniform numbers across the range of 32 bit values.

Threshold Function:

A threshold function performs a calculation to determine whether a value is above or below a given level. This action produces discontinuous results, placing some values above and others below the threshold. It may optionally perform some transformation on its input value. As an example:

threshold_value=(hash−1) ^ hash;

or:

threshold_value=((hash−1) ^ hash)+length;

The system and method of the present invention for sticky byte factoring advantageously partitions data sets into sequences that promote commonality. The ensuing example, is illustrative of a preferred implementation utilizing a 32-bit rolling hash together with a threshold function which may be carried out particularly well with modern 32-bit microprocessors.

A rolling hash of 32 bits is generated using the byte array "f" as the input sequence to be partitioned where:

1. f[i]=is the i-th byte of the byte sequence contained in "f".

2. "Scramble" is a 256-element array of 32-bit integers chosen to "churn" the bits in the hashsum created. These integers are typically chosen to have the characteristic that their combined exclusive OR ("XOR") equals zero, meaning they have a combined binary equality of one and zero bits.

3. The "^" operator is the exclusive-or function.

4. The length_of_byte_sequence is the length of the sequence being partitioned.

5. The function "output_sticky_point" is called with the index of the partitioning element.

6. "threshold" is a value chosen to produce sequences of the desired length. That is, the larger the value, the longer the sequences produced.

EXAMPLE 1

```
int hash = 0; //initial value of hashsum is zero.
int sticky_bits = 0;
int last_sticky_point = 0;
for( int i=O; i < length_of_byte_sequence; i++ )
{
//For each byte in the sequence of "f", "hash"
//represents the rolling hash of the file.
    hash = (hash >> 1) | scramble [f[i]];
//sticky_bits is a non-uniform value with the
//characteristic that larger values are produced less
//frequently.
    sticky_bits = (hash − 1) ^ hash;
//This calculation determines whether the current byte
//should be considered the end of the partition.
    if( sticky_bits > threshold )
```

-continued

```
{
    output_sticky_point ( i );
//"last_sticky_point" remembers the index of the
//previous partition for (optional) use in determining
//the existing partition's length as a factor in the
//threshold calculation.
    last_sticky_point = i;
    }
}
```

The system and method of the present invention steps sequentially through a sequence of values and calculates a rolling hashsum value. That hashsum value at index "i" is dependent only on the bytes at indexes i-31 through i. In the case of i being less than 31, the hashsum reflects the values for the bytes between 0 and i. Assuming an input text in "f" that uses a large range of byte values and a well chosen set of randomizing values present in "scramble", the hashsum will produce a well-distributed range of values, that largely and uniformly spans the desired 32-bit numeric range. While it should be noted that some byte sequences do not produce well-distributed numbers, byte sequences having this behavior should be uncommon for typical input texts.

The "sticky_bits" value is calculated using the current hashsum. This value is designed to have a highly non-uniform distribution and to produce numbers that span the entire range of 32-bit values, with larger values being produced in inverse proportion to their magnitude as illustrated in the following Table 1:

TABLE 1

| Sticky Byte Value | % of Sequences w/Value |
|---|---|
| 1 | 50.00000 |
| 3 | 25.00000 |
| 7 | 12.50000 |
| 15 | 6.25000 |
| 31 | 3.12500 |
| 63 | 1.56250 |
| 127 | 0.78125 |
| 255 | 0.39062 |
| 511 | 0.19531 |
| 1023 | 0.09766 |
| 2047 | 0.04883 |
| 4095 | 0.02441 |
| 8191 | 0.01221 |
| 16383 | 0.00610 |
| 32767 | 0.00305 |
| 65535 | 0.00153 |
| etc. | etc. |

Without further modification, this particular example demonstrates the statistical property of having sequence lengths with a standard deviation that are 95% of their mean. In order to compensate for this, the "sticky_bits" value can be combined with the length of the current sequence to produce partitions more evenly spaced. In this regard, "sticky_weighting" is a factor that is used to adjust the weight of the "sticky_bits" value versus the length of the current partition.

sticky_weighting+($i-last\_sticky\_point$)

EXAMPLE 2

```
int hash = 0; //initial value of hashsum is zero.
int sticky_bits = 0;
int last_sticky_point = 0;
for( int i=O; i < length_of_byte_sequence; i++ )
{
//For each byte in the sequence of "f", "hash"
//represents the rolling hash of the file.
    hash = (hash >> 1) | scramble [f[i]];
//sticky_bits is a non-uniform value with the
//characteristic that larger values are produced less
//frequently.
    sticky_bits = (hash - 1) ^ hash;
//This calculation determines whether the current byte
//should be considered the end of the partition.
    if( sticky_bits +
sticky_weighting* (i-last_sticky_point) > threshold )
    {
        output_sticky_point( i );
//"last-sticky-point" remembers the index of the
//previous partition for optional use in determining
//the existing partition's length as a factor in the
//threshold calculation.
        last_sticky_point = i;
    }
}
```

In this particular embodiment of the system and method of the present invention, an adjustment has been made to produce more consistent partition sizes. This is effectuated by essentially increasing the "pressure" on the threshold to create a partition as the potential partition size increases. It should be noted that any number of a variety of methods for effectuating this end might be employed and the foregoing example is intended to illustrate but one.

As will be appreciated, the system and method of the present invention for unorchestrated determination of data sequences disclosed herein provides an efficient and readily effectuated means to factor large volumes of data into their common sequences using modern computer processors. Unlike conventional factoring techniques, it requires no sequence comparisons, communication, or historical record of previous actions in order to establish commonality. Further, the system and method of the present invention is essentially immune to the type of data being partitioned and it performs consistently on text files, binary files, set images, audio and video clips, still images and the like.

The sticky byte factoring technique disclosed herein also advantageously creates partitions that tend to identify commonality even when that commonality lies in variable locations within a sequence; for example, while the difference between two versions of a particular document file might be only minor, sticky byte factoring nevertheless produces a high commonality between the factored documents despite the insertion or deletion of characters. Moreover, the system and method of the present invention creates partitions, or breakpoints, that tend to identify commonality in data that "slides", or changes its absolute location.

In essence, the system and method of the present invention effectively solves the problem of how to locate common data sequences quickly and efficiently. Further, it can be used to search for alternative encodings of a sequence of data that would have a higher likelihood of being present in a system designed to store information based on such a partitioning scheme. The sticky byte factoring technique of the present invention performs particularly well when searching for common sequences in typical computer file systems and produces much higher compression ratios for some test suites than even the best known compression algorithms, many of which exploit commonality factoring as their fundamental file size reduction technique.

Although as used herein, the term "Internet infrastructure" encompasses a variety of hardware and software mechanisms, the term primarily refers to routers, router software, and physical links between these routers that function to transport data packets from one network node to another. As also used herein, a "digital sequence" may comprise, without limitation, computer program files, computer applications, data files, network packets, streaming data such as multimedia (including audio and video), telemetry data and any other form of data which can be represented by a digital or numeric sequence.

While there have been described above the principles of the present invention in conjunction with specific exemplary sticky byte factoring techniques and computer systems, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for partitioning a digital sequence comprising:
   performing a hash function on at least a portion of said digital sequence;
   monitoring hash values produced by said hash function for a first predetermined numeric pattern found in a range of numeric values; and
   marking a breakpoint in said digital sequence when said first predetermined numeric pattern occurs,
   said step of performing said hash function comprising a rolling hash function adapted to scan portions of said digital sequence combined with adjusting a hash value based on a length of a current partition of said digital sequence to increase a likelihood of identifying a breakpoint in said current partition as a potential length of said current partition increases.

2. The method of claim 1, wherein said first predetermined numeric pattern is a bit pattern.

3. The method of claim 1, wherein said rolling hash function comprises a 32-bit hash function.

4. The method of claim 1, wherein said first predetermined numeric pattern comprises a consecutive sequence of bits.

5. The method of claim 4, wherein during said monitoring said consecutive sequence of bits is found in said hash values, the hash values comprising hash sequences that are not numerically consecutive.

6. The method of claim 4, wherein said consecutive sequence of bits comprises a plurality of endmost bits.

7. The method of claim 1, further comprising:
   determining a threshold restriction for said step of monitoring said hash values; and
   increasing a probability of said marking of said breakpoint in said digital sequence.

8. The method of claim 7, wherein said step of increasing said probability of said marking of said breakpoint in said digital sequence is a function of at least a desired chunk size.

9. The method of claim 7, wherein said step of increasing said probability of said marking of said breakpoint in said digital sequence is carried out by the step of:
   utilizing a second predetermined numeric pattern for said step of monitoring said hash values; and
   alternatively marking said breakpoint when said second predetermined numeric pattern occurs.

10. The method of claim 7, wherein said step of increasing said probability of said marking of said breakpoint in said digital sequence is a function of some content portion of said sequence.

11. A method for determining at least a first breakpoint in at least a first digital sequence comprising:
    determining a subset group of said first digital sequence;
    performing a hash function on said subset group of said first digital sequence beginning at a starting position in said first digital sequence until a first predetermined numeric pattern, which is found in a range of numeric values, in said hash value is obtained, wherein said hash function is combined with adjusting said hash value based on a length of a current partition of said first digital sequence to increase a likelihood of identifying said first breakpoint in said current partition as a potential length of said current partition increases; and
    marking said first breakpoint when said first predetermined numeric pattern in said hash value is obtained.

12. The method of claim 11, wherein said numeric pattern comprises a bit pattern.

13. The method of claim 11, wherein said step of performing a hash function comprises a rolling hash function that scans portions of said digital sequence.

14. The method of claim 11, further comprising the steps of:
    further performing a hash function on another subset group of said first digital sequence from said first breakpoint until said first predetermined numeric pattern in said hash value is again obtained; and
    marking another breakpoint in said first digital sequence when said first predetermined numeric pattern in said hash value is again obtained.

15. The method of claim 14, wherein said step of further performing said hash function is carried out by means of a rolling hash function.

16. The method of claim 11, further comprising the steps of:
    determining a second predetermined numeric pattern in said hash value; and
    continuing said step of performing said hash function on said subset group of said first digital sequence until an established threshold restriction has been met.

17. The method of claim 11, further comprising the steps of:

storing said predetermined hash value of said first breakpoint in a data storage, said predetermined hash value of said first breakpoint pointing to a corresponding portion of said first digital data sequence from said starting point to said first breakpoint;

performing a hash function on a subset group beginning at a starting position in a second digital sequence until said first predetermined numeric pattern in said hash value is obtained;

marking a second breakpoint in said second digital sequence when said first predetermined numeric pattern in said hash value is obtained;

comparing said predetermined hash value at said first breakpoint with said predetermined hash value at said second breakpoint if said predetermined hash value of said first breakpoint is not the same as said predetermined hash value of said second breakpoint, replacing said predetermined hash value of said first breakpoint in said data storage, said predetermined hash value of said second breakpoint pointing to a corresponding portion of said second digital data sequence from said starting point to said second breakpoint; and if said predetermined hash value of said first breakpoint is the same as said predetermined hash value of said second breakpoint, storing said predetermined hash value of said second breakpoint in said data storage, said predetermine hash value of said second breakpoint pointing to said predetermined hash value of said first breakpoint.

18. A computer program product comprising:

a computer usable medium having computer readable code embodied therein for determining at least a first breakpoint in a first digital sequence comprising:

computer readable program code devices configured to cause a computer to effect determining a subset group of said first digital sequence;

computer readable program code devices configured to cause a computer to effect performing a hash function on said subset group of said first digital sequence beginning at a starting position in said first digital sequence until a first predetermined numeric pattern in said hash value is obtained, wherein said hash function is combined with adjusting said hash value based on a length of a current partition of said first digital sequence to increase a likelihood of identifying a first breakpoint in said current partition as a potential length of said current partition increases;

computer readable program code devices configured to cause a computer to effect marking said first breakpoint when said first predetermined numeric pattern in said hash value is obtained;

computer readable program code devices configured to cause a computer to effect storing said predetermined hash value of said first breakpoint in a data storage, said predetermined hash value of said first breakpoint pointing to a corresponding portion of said first digital data sequence from said starting point to said first breakpoint;

computer readable program code devices configured to cause a computer to effect performing a hash function on a subset group beginning at a starting position in a second digital sequence until said first predetermined numeric pattern in said hash value is obtained;

computer readable program code devices configured to cause a computer to effect marking a second breakpoint in said second digital sequence when said first predetermined numeric pattern in said hash value is obtained, wherein said hash function is combined with adjusting said hash value based on a length of a current partition of said second digital sequence to increase a likelihood of identifying said second breakpoint in said current partition as a potential length of said current partition increases; and computer readable program code devices configured to cause a computer to effect comparing said predetermined hash value at said first breakpoint with said predetermined hash value at said second breakpoint, wherein if said predetermined hash value of said first breakpoint is not the same as said predetermined hash value of said second breakpoint, replacing said predetermined hash value of said first breakpoint in said data storage, said predetermined hash value of said second breakpoint pointing to a corresponding portion of said second digital data sequence from said starting point to said second breakpoint; and if said predetermined hash value of said first breakpoint is the same as said predetermined hash value of said second breakpoint, storing said predetermined hash value of said second breakpoint in said data storage, said predetermine hash value of said second breakpoint pointing to said predetermined hash value of said first breakpoint.

19. The computer program product of claim 18, wherein said numeric pattern comprises a bit pattern.

20. The computer program product of claim 18, wherein said computer readable program code devices configured to cause a computer to effect performing a hash function is carried out by means of a rolling hash function.

21. The computer program product of claim 18, further comprising:

computer readable program code devices configured to cause a computer to effect further performing a hash function on another subset group of said first digital sequence from said first breakpoint until said first predetermined numeric pattern in said hash value is again obtained; and computer readable program code devices configured to cause a computer to effect marking another breakpoint in said first digital sequence when said first predetermined numeric pattern in said hash value is again obtained.

22. The computer program product of claim 21, wherein said computer readable program code devices configured to cause a computer to effect further performing said hash function is carried out by means of a rolling hash function.

23. The computer program product of claim 18, further comprising:

computer readable program code devices configured to cause a computer to effect determining a second predetermined numeric pattern in said hash value;

computer readable program code devices configured to cause a computer to effect continuing said step of performing said hash function on said subset group of said first digital sequence until an established threshold restriction has been met; and computer readable program code devices configured to cause a computer to effect alternatively marking said first breakpoint when said second predetermined numeric pattern in said hash value is obtained.

24. A method for determining at least a first breakpoint in at least a first digital sequence comprising:

determining a subset group of said first digital sequence;
performing a hash function on said subset group of said first digital sequence beginning at a starting position in said first digital sequence until a first predetermined numeric pattern is found in the hash values from the said hash function is obtained, wherein the hash function is a 32-bit rolling hash function and the subset group is a 32-bit pattern derived directly or indirectly from the said first digital sequence combined with adjusting said hash value based on a length of a current partition of said first digital sequence to increase a likelihood of identifying said first breakpoint in said current partition as a potential length of said current partition increases, and the performing comprises shifting the 32-bit pattern over one bit, reading a character from the first digital sequence and deriving directly or indirectly another 32-bit pattern, and repeating the shifting and the reading, until there are 32-bits in sequence that can be hashed together to provide one said hash value;
marking said first breakpoint when said first predetermined numeric pattern in said hash value is obtained;
further performing a hash function on another subset group of said first digital sequence from said first breakpoint until said first predetermined numeric pattern in said hash value is again obtained; and
marking another breakpoint in said first digital sequence when said first predetermined numeric pattern in said hash value is again obtained.

25. The method of claim 24, wherein said step of further performing said hash function is carried out by means of a rolling hash function.

26. The method of claim 24, further comprising the steps of
storing said predetermined hash value of said first breakpoint in a data storage, said predetermined hash value of said first breakpoint pointing to a corresponding portion of said first digital data sequence from said starting point to said first breakpoint;
performing a hash function on a subset group beginning at a starting position in a second digital sequence until said first predetermined numeric pattern in said hash value is obtained;
marking a second breakpoint in said second digital sequence when said first predetermined numeric pattern in said hash value is obtained;
comparing said predetermined hash value at said first breakpoint with said predetermined hash value at said second breakpoint;
if said predetermined hash value of said first breakpoint is not the same as said predetermined hash value of said second breakpoint, replacing said predetermined hash value of said first breakpoint in said data storage, said predetermined hash value of said second breakpoint pointing to a corresponding portion of said second digital data sequence from said starting point to said second breakpoint; and
if said predetermined hash value of said first breakpoint is the same as said predetermined hash value of said second breakpoint, storing said predetermined hash value of said second breakpoint in said data storage, said predetermine hash value of said second breakpoint pointing to said predetermined hash value of said first breakpoint, thereby equating a corresponding portion of said first digital sequence from said starting point to said first breakpoint with a corresponding portion of said second digital sequence from said staffing position to said second breakpoint.

27. A computer program product comprising:
a computer usable medium having computer readable code embodied therein for determining a first breakpoint in a first digital sequence comprising:
computer readable program code devices configured to cause a computer to effect determining a subset group of said first digital sequence;
computer readable program code devices configured to cause a computer to effect performing a hash function on said subset group of said first digital sequence beginning at a starting position in said first digital sequence until a first predetermined numeric pattern in said hash value is obtained combined with adjusting said hash value based on a length of a current partition of said first digital sequence to increase a likelihood of identifying said first breakpoint in said current partition as a potential length of said current partition increases, wherein the hash function is a 32-bit rolling hash function and the subset group is a 32-bit pattern, and the performing comprises shifting the 32-bit pattern over one bit, reading a character from the first digital sequence, and repeating the shifting and the reading; and
computer readable program code devices configured to cause a computer to effect marking said first breakpoint when said first predetermined numeric pattern in said hash value is obtained.

28. The computer program product of claim 27, further comprising:
computer readable program code devices configured to cause a computer to effect further performing a hash function on another subset group of said first digital sequence from said first breakpoint until said first predetermined numeric pattern in said hash value is again obtained; and
computer readable program code devices configured to cause a computer to effect marking another breakpoint in said first digital sequence when said first predetermined numeric pattern in said hash value is again obtained.

29. The computer program product of claim 28, wherein said computer readable program code devices configured to cause a computer to effect further performing said hash function is carried out by means of a rolling hash function.

30. The computer program product of claim 27, further comprising:
computer readable program code devices configured to cause a computer to effect determining a second predetermined numeric pattern in said hash value;
computer readable program code devices configured to cause a computer to effect continuing said step of performing said hash function on said subset group of said first digital sequence until an established threshold restriction has been met; and
computer readable program code devices configured to cause a computer to effect alternatively marking said first breakpoint when said second predetermined numeric pattern in said hash value is obtained.

31. The computer program product of claim 27, further comprising:
computer readable program code devices configured to cause a computer to effect performing a hash function on a subset group beginning at a starting position in a second digital sequence until said first predetermined numeric pattern in said hash value is obtained;

computer readable program code devices configured to cause a computer to effect marking a second breakpoint in said second digital sequence when said first predetermined numeric pattern in said hash value is obtained;

computer readable program code devices configured to cause a computer to effect comparing said predetermined hash value at said first breakpoint with said predetermined hash value at said second breakpoint; and computer readable program code devices configured to cause a computer to effect equating a corresponding portion of said first digital sequence from said starting point to said first breakpoint with a corresponding portion of said second digital sequence from said starting position to said second breakpoint.

32. A method for partitioning a digital sequence comprising:

performing a rolling hash function on at least a portion of a digital sequence to produce binary sequences, said hash function being combined with adjusting a hash value based on a length of a current partition of said digital sequence to increase a likelihood of identifying a breakpoint in said current partition as a potential length of said current partition increases;

monitoring said binary sequences produced by said hash function for a predetermined pattern of bits; and marking said breakpoint in said digital sequence when said predetermined pattern occurs.

33. The method of claim 32, wherein the predetermined pattern of bits comprises a consecutive sequence of bits.

34. The method of claim 33, wherein the consecutive sequence of bits comprises a plurality of endmost bits.

35. The method of claim 32, wherein the performing of the hash function comprises performing a rolling hash function adapted to scan portions of said digital sequence.

36. A computer program product comprising:

computer readable program code devices configured to cause a computer to effect performing a rolling hash function on at least a portion of a digital sequence to produce binary sequences, said hash function being combined with adjusting said hash value based on a length of a current partition of said first digital sequence to increase a likelihood of identifying said first breakpoint in said current partition as a potential length of said current partition increases;

computer readable program code devices configured to cause a computer to effect monitoring said binary sequences produced by said hash function for a predetermined pattern of bits; and computer readable program code devices configured to cause a computer to effect marking said breakpoint in said digital sequence when said predetermined pattern occurs.

37. A method for partitioning a digital sequence comprising:

performing a mathematical function that produces a statistically infrequent arrangement of n bytes on at least a portion of a digital sequence to produce binary sequences, said mathematical function that produces statistically infrequent arrangement of n bytes being combined with adjusting said mathematical function that produces statistically infrequent arrangement of n bytes based on a length of a current partition of said digital sequence to increase a likelihood of identifying a breakpoint in said current partition as a potential length of said current partition increases;

monitoring said binary sequences produced by the mathematical function that produces statistically infrequent arrangement of n bytes for a first predetermined pattern of bits; and marking said breakpoint in the digital sequence when the first predetermined pattern is identified as occurring during the monitoring.

38. The method of claim 37, wherein said step of performing said mathematical function that produces statistically infrequent arrangement of n bytes function comprises a rolling hash function adapted to scan portions of said digital sequence.

39. The method of claim 37, further comprising:

determining a threshold restriction for said step of monitoring said binary sequences; and increasing a probability of said marking of said breakpoint in said digital sequence.

40. The method of claim 39, wherein the increasing of said probability of said marking of said breakpoint in said digital sequence is carried out by the steps of:

utilizing a second predetermined numeric pattern for said step of monitoring said binary sequences; and alternatively marking said breakpoint when said second predetermined numeric pattern occurs.

41. The method of claim 39, wherein the increasing of said probability of said marking of said breakpoint in said digital sequence is a function of some content portion of said sequence.

42. A computer program product comprising:

computer readable program code devices configured to cause a computer to effect performing a mathematical function that produces a statistically infrequent arrangement of n bytes on at least a portion of a digital sequence to produce binary sequences, said mathematical function that produces statistically infrequent arrangement of n bytes being combined with adjusting said mathematical function that produces statistically infrequent arrangement of n bytes based on a length of a current partition of said digital sequence to increase a likelihood of identifying a breakpoint in said current partition as a potential length of said current partition increases;

computer readable program code devices configured to cause a computer to effect monitoring said binary sequences produced by the mathematical function that produces statistically infrequent arrangement of n bytes for a first predetermined pattern of bits; and computer readable program code devices configured to cause a computer to effect marking said breakpoint in the digital sequence when the first predetermined pattern is identified as occurring during the monitoring.

43. The computer program product of claim 42, wherein said performing said mathematical function that produces statistically infrequent arrangement of n bytes comprises performing a rolling hash function adapted to scan portions of said digital sequence.

44. The computer program product of claim 42, further comprising:

computer readable program code devices configured to cause a computer to effect determining a threshold restriction for said step of monitoring said binary sequences; and computer readable program code devices configured to cause a computer to effect increasing a probability of said marking of said breakpoint in said digital sequence.

45. The computer program product of claim 44, wherein the increasing of said probability of said marking of said breakpoint in said digital sequence comprises:
utilizing a second predetermined numeric pattern for said step of monitoring said binary sequences; and
alternatively marking said breakpoint when said second predetermined numeric pattern occurs.

46. The computer program product of claim 42, wherein the increasing of said probability of said marking of said breakpoint in said digital sequence is a function of some content portion of said sequence.

47. A method for partitioning a digital sequence comprising:
performing a mathematical function that produces statistically infrequent arrangement of n bytes on at least a portion of a digital sequence to produce hash values, said mathematical function that produces statistically infrequent arrangement of n bytes being combined with adjusting said mathematical function that produces statistically infrequent arrangement of n bytes based on a length of a current partition of said digital sequence to increase a likelihood of identifying a breakpoint in said current partition as a potential length of said current partition increases;
monitoring said hash values produced by the mathematical function that produces statistically infrequent arrangement of n bytes for a numeric pattern selected from a range of numeric values; and
marking said breakpoint in the digital sequence when the numeric pattern occurs according to the monitoring.

48. A computer program product comprising:
computer readable program code devices configured to cause a computer to effect performing a mathematical function that produces statistically infrequent arrangement of n bytes on at least a portion of a digital sequence to produce hash values, said mathematical function that produces statistically infrequent arrangement of n bytes being combined with adjusting said mathematical function that produces statistically infrequent arrangement of n bytes based on a length of a current partition of said digital sequence to increase a likelihood of identifying a breakpoint in said current partition as a potential length of said current partition increases;
computer readable program code devices configured to cause a computer to effect monitoring hash values produced by the mathematical function that produces statistically infrequent arrangement of n bytes for a numeric pattern selected from a range of numeric values and
computer readable program code devices configured to cause a computer to effect marking said breakpoint in the digital sequence when the numeric pattern occurs according to the monitoring.

49. A method for partitioning a digital sequence comprising:
performing a mathematical function that produces statistically infrequent arrangement of n bytes on at least a portion of said digital sequence, the performing comprising:
indexing bytes from the digital sequence into an array of alternative pre-determined bit sequences;
performing a hash function on the pre-determined bit sequences, said hash function being combined with adjusting said hash function based on a length of a current partition of said digital sequence to increase a likelihood of identifying a breakpoint in said current partition as a potential length of said current partition increases;
monitoring the bit sequences produced by the said hash function for a first predetermined bit pattern; and
marking said breakpoint in said digital sequence when said first predetermined bit pattern occurs.

50. The method of claim 49, wherein said alternative pre-determined bit sequences are 32-bit sequences.

51. The method of claim 49, wherein said alternative pre-determined bit sequences are 32-bit sequences selected to normalize breakpoints around a certain data block size.

52. A computer program product comprising:
computer readable program code devices configured to cause a computer to effect performing a mathematical function that produces statistically infrequent arrangement of n bytes on at least a portion of said digital sequence, the computer readable program code devices comprising additional computer readable program code devices configured to cause a computer to effect:
indexing bytes from the digital sequence into an array of alternative pre-determined bit sequences;
performing a hash function on the pre-determined bit sequences, said has function being combined with adjusting said hash function based on a length of a current partition of said digital sequence to increase a likelihood of identifying a breakpoint in said current partition as a potential length of said current partition increases;
monitoring the bit sequences produced by the said hash function for a first predetermined bit pattern; and
marking said breakpoint in said digital sequence when said first predetermined bit pattern occurs.

53. A method for partitioning a digital sequence comprising:
processing at least a portion of a digital sequence to produce a transformation;
performing a rolling hash function on the transformation to produce binary sequences, said hash function being combined with adjusting said hash function based on a length of a current partition of said digital sequence to increase a likelihood of identifying a breakpoint in said current partition as a potential length of said current partition increases;
monitoring said binary sequences produced by the hash function for a pattern of bits; and
marking said breakpoint in the digital sequence when said first predetermined pattern occurs as determined by the monitoring.

54. The method of claim 53, wherein the processing to produce the transformation and the hash function are configured to produce a plurality of the breakpoints aggregating around a pre-determined data block size as opposed to a flat distribution of data block sizes.

55. The method of claim 53, wherein the transformation indexes the processed portion of the digital sequence into one of "n" pre-determined numbers or numeric sequences.

56. A computer program product comprising:
computer readable program code devices configured to cause a computer to effect processing at least a portion of a digital sequence to produce a transformation;
computer readable program code devices configured to cause a computer to effect performing a rolling hash function on the transformation to produce binary sequences, said hash function being combined with adjusting said hash function based on a length of a current partition of said digital sequence to increase a likelihood of identifying a breakpoint in said current partition as a potential length of said current partition increases;

computer readable program code devices configured to cause a computer to effect monitoring said binary sequences produced by the hash function for a pattern of bits; and computer readable program code devices configured to cause a computer to effect marking said breakpoint in the digital sequence when said first predetermined pattern occurs as determined by the monitoring.

57. The computer program product of claim 56, wherein the processing to produce the transformation and the hash function are configured to produce a plurality of the breakpoints aggregating around a pre-determined data block size as opposed to a flat distribution of data block sizes.

58. The computer program product of claim 57, wherein the transformation indexes the processed portion of the digital sequence into one of "n" pre-determined numbers or numeric sequences.

* * * * *

UNITED STATES PATENT AND TRADEMARK OFFICE
CERTIFICATE OF CORRECTION

PATENT NO. : 7,272,602 B2
APPLICATION NO. : 10/861796
DATED : September 18, 2007
INVENTOR(S) : Gregory Hagan Moulton It is certified that error appears in the above-identified patent and that said Letters Patent is hereby corrected as shown below:

Drawings
Sheet 7, replace Fig. 8 with the figure depicted herein below, wherein in 704 "Hash for #12" has been changed to --Hash for #10--

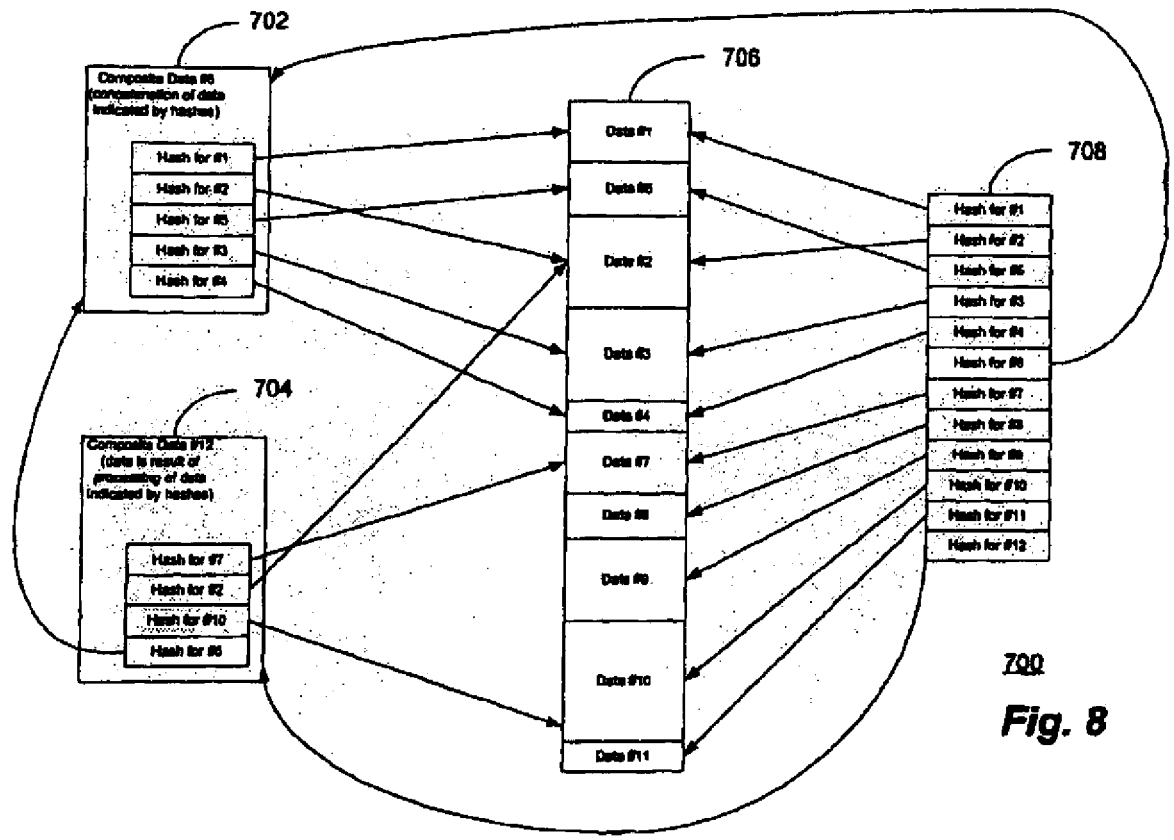

Fig. 8

Column 5
Line 46, change "stance" to --distances--

Column 8
Line 2, change ""recipe", or formula" to --"recipe" or formula--
Line 37, change "is shown illustrative of" to --illustrates--
Line 50, change "37 912" to --37, which is also at number 912--

Column 9
Line 19, change ""Day 2"." to --"Day 2."--
Line 20, change ""Day 1"," to --"Day 1,"--
Line 27, change ""Day 2"," to --"Day 2,"--
Line 60, change "1212 (2.)" to --1212 (2.2)--

Column 11
Line 58, change ""0"'s" to --"0s"--
Line 63, change ""chunk"." to --"chunk."--

Column 13
Replace Table 1 with the table depicted herein below, wherein "Sticky Byte" has been changed to --"sticky_bits"--

TABLE 1

| "sticky_bits" Value | % of Sequences w/Value |
|---|---|
| 1 | 50.00000 |
| 3 | 25.00000 |
| 7 | 12.50000 |
| 15 | 6.25000 |
| 31 | 3.12500 |
| 63 | 1.56250 |
| 127 | 0.78125 |
| 255 | 0.39062 |
| 511 | 0.19531 |
| 1023 | 0.09766 |
| 2047 | 0.04883 |
| 4095 | 0.02441 |
| 8191 | 0.01221 |
| 16383 | 0.00610 |
| 32767 | 0.00305 |
| 65535 | 0.00153 |
| etc. | etc. |

Column 14
Line 58, change ""slides"," to --"slides,"--

Claim 17
Column 17, line 28, change "predetermine" to --predetermined--

Claim 18
Column 18, line 26, change "predetermine" to --predetermined--

Claim 24
Column 19, line 64, change "predetermine" to --predetermined--

CERTIFICATE OF CORRECTION (continued)
U.S. Pat. No. 7,272,602 B2

Claim 48
Column 23, line 54, change "values and" to --values and;--

Claim 52
Column 24, line 28, change "has function" to --hash function--

Signed and Sealed this

Fifth Day of January, 2010

David J. Kappos
*Director of the United States Patent and Trademark Office*